(12) United States Patent
Nguyen et al.

(10) Patent No.: US 12,040,914 B2
(45) Date of Patent: Jul. 16, 2024

(54) SYSTEM AND METHOD FOR DETECTING NETWORK SERVICES BASED ON NETWORK TRAFFIC USING MACHINE LEARNING

(71) Applicant: Samsung Electronics Co., Ltd., Suwon-si (KR)

(72) Inventors: Khuong N. Nguyen, Frisco, TX (US); Guanbo Chen, McKinney, TX (US); Hao Chen, Plano, TX (US); Abhishek Sehgal, Plano, TX (US); Rebal Al Jurdi, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/047,241

(22) Filed: Oct. 17, 2022

(65) Prior Publication Data

US 2023/0216760 A1 Jul. 6, 2023

Related U.S. Application Data

(60) Provisional application No. 63/295,743, filed on Dec. 31, 2021.

(51) Int. Cl.
*H04L 12/28* (2006.01)
*G06F 9/50* (2006.01)
*G06F 16/958* (2019.01)
*H04L 41/16* (2022.01)
(Continued)

(52) U.S. Cl.
CPC .......... *H04L 12/2876* (2013.01); *G06F 9/505* (2013.01); *G06F 16/958* (2019.01);
(Continued)

(58) Field of Classification Search
CPC ............. H04L 47/2425; H04L 41/5009; H04L 41/5019; H04L 41/147; H04L 43/0888;
(Continued)

(56) References Cited

U.S. PATENT DOCUMENTS 9,801,085 B2 10/2017 Hevizi et al.
10,194,391 B2 1/2019 Asterjadhi et al.
(Continued)

FOREIGN PATENT DOCUMENTS

CN 109639481 A 4/2019
CN 110730140 A 1/2020
(Continued)

OTHER PUBLICATIONS

International Search Report dated Aug. 3, 2022 regarding International Application No. PCT/KR2022/005738, 3 pages.
(Continued)

*Primary Examiner* — Kyung H Shin

(57) ABSTRACT

A method includes obtaining input features based on network traffic received during a time window. The method also includes generating multiple network service type predictions about the network traffic during the time window using a machine learning (ML) classification system operating on the input features. The method also includes storing the multiple network service type predictions in different time steps in a first-in first-out (FIFO) buffer and generating decisions about a presence of each of multiple service types in the network traffic using a voting algorithm. The method also includes reducing fluctuations in the generated decisions using a logic-based stabilizer module to generate a final network service type decision.

20 Claims, 23 Drawing Sheets

(51) Int. Cl.
    *H04L 43/028*     (2022.01)
    *H04L 43/062*     (2022.01)
    *H04L 47/2425*     (2022.01)
    *H04L 47/2441*     (2022.01)
    *H04L 67/50*     (2022.01)

(52) U.S. Cl.
CPC ............ *H04L 41/16* (2013.01); *H04L 43/028* (2013.01); *H04L 43/062* (2013.01); *H04L 47/2425* (2013.01); *H04L 47/2441* (2013.01); *H04L 67/535* (2022.05)

(58) Field of Classification Search
CPC ... H04L 63/1408; H04L 67/535; H04L 63/20; H04L 63/205; H04L 63/1425; H04L 43/16; H04L 47/83; H04L 67/146; H04L 43/12; H04L 67/1021; H04L 67/10; H04L 67/63; H04L 43/0882; H04L 67/60; H04L 61/50; H04L 67/1008; H04L 47/823; H04L 47/2441; H04L 47/2483; H04L 49/90; H04L 12/2876; H04L 47/826; H04L 43/00; H04L 47/24; H04L 47/70; H04L 41/0896; H04L 47/808; H04L 47/263; H04L 41/5022; H04L 12/2801; H04L 47/762; H04L 47/11; H04L 45/245; H04L 12/2861; G06N 7/01; G06N 20/00; G06N 5/022; G06Q 10/04; G06F 16/958; G06F 21/50; G06F 21/554; G06F 21/55; G06F 11/00; G06F 9/505; G06F 9/5077; G06F 9/5072; G06F 11/3409; H04W 12/60; H04W 12/12; H04N 21/6118; H04N 7/17309

See application file for complete search history.

(56) References Cited

U.S. PATENT DOCUMENTS

| | | | |
|---|---|---|---|
| 10,925,001 B2 | 2/2021 | Bhanage et al. | |
| 10,999,325 B1* | 5/2021 | Chandana | H04L 67/535 |
| 2006/0120282 A1* | 6/2006 | Carlson | H04L 12/2876 |
| | | | 370/431 |
| 2007/0078958 A1* | 4/2007 | Bennett | G06F 16/958 |
| | | | 709/223 |
| 2014/0135051 A1 | 5/2014 | Ghosh | |
| 2014/0321290 A1* | 10/2014 | Jin | H04L 47/2441 |
| | | | 370/241 |
| 2014/0334365 A1 | 11/2014 | Jafarian et al. | |
| 2015/0195149 A1* | 7/2015 | Vasseur | H04L 47/2425 |
| | | | 370/252 |
| 2016/0381636 A1 | 12/2016 | Park et al. | |
| 2018/0150125 A1 | 5/2018 | HomChaudhuri et al. | |
| 2019/0306790 A1 | 10/2019 | Kottontavida et al. | |
| 2020/0084102 A1 | 3/2020 | Choi et al. | |
| 2020/0137612 A1 | 4/2020 | Li et al. | |
| 2020/0304381 A1 | 9/2020 | Wang et al. | |
| 2020/0366717 A1 | 11/2020 | Chaubey | |
| 2021/0037546 A1 | 2/2021 | Luo et al. | |
| 2021/0044572 A1 | 2/2021 | Liu et al. | |
| 2021/0136178 A1* | 5/2021 | Casey | G06F 9/505 |

FOREIGN PATENT DOCUMENTS

| | | | |
|---|---|---|---|
| CN | 110311829 B | | 3/2021 |
| CN | 109787958 B | | 5/2021 |
| CN | 112994966 A | | 6/2021 |
| CN | 110430166 B | | 12/2021 |
| CN | 113890857 A | * | 1/2022 |

OTHER PUBLICATIONS

Tang et al., "Fine-Grained Classification of Internet Video Traffic From QoS Perspective Using Fractal Spectrum", IEEE Transactions on Multimedia, vol. 22, No. 10, Dec. 2019, pp. 2579-2596.

USPTO, Office Action issued May 20, 2024 regarding U.S. Appl. No. 17/656,589, 8 pages.

* cited by examiner

SYSTEM AND METHOD FOR DETECTING NETWORK SERVICES BASED ON NETWORK TRAFFIC USING MACHINE LEARNING

CROSS-REFERENCE TO RELATED APPLICATIONS AND CLAIM OF PRIORITY

The present application claims priority to U.S. Provisional Patent Application No. 63/295,743 filed on Dec. 31, 2021. The content of the above-identified patent document is incorporated herein by reference.

TECHNICAL FIELD

The present disclosure relates generally to wireless communication systems and, more specifically, the present disclosure relates to a system and method for detecting network services based on network traffic using machine learning.

BACKGROUND

With the standardization process of the next generation IEEE 802.11 wireless local area network (WLAN), i.e., IEEE 802.11ax amendment entering the final stage, the IEEE 802.11ax amendment is drawing attention of the information technology (IT) industry. It newly introduces features for improving peak throughput and efficiency in an environment crowded by many 802.11 devices. Example environments include airports, stadiums, and so on. Wi-Fi alliance (WFA) has already launched the Wi-Fi 6 certification program for guaranteeing interoperability between certified products implementing IEEE 802.11ax amendment. In the market, device manufacturers are already starting to release Wi-Fi 6 certified smart mobile devices.

SUMMARY

The present disclosure relates to wireless communication systems and, more specifically, the present disclosure relates to a system and method for detecting network services based on network traffic using machine learning.

In one embodiment, a method includes obtaining input features based on network traffic received during a time window. The method also includes generating multiple network service type predictions about the network traffic during the time window using a machine learning (ML) classification system operating on the input features. The method also includes storing the multiple network service type predictions in different time steps in a first-in first-out (FIFO) buffer and generating decisions about a presence of each of multiple service types in the network traffic using a voting algorithm. The method also includes reducing fluctuations in the generated decisions using a logic-based stabilizer module to generate a final network service type decision.

In another embodiment, a device includes a transceiver configured to receive network traffic during a time window. The device also includes a processor operably connected to the transceiver. The processor is configured to obtain input features based on the network traffic; generate multiple network service type predictions about the network traffic during the time window using a ML classification system operating on the input features; store the multiple network service type predictions in different time steps in a FIFO buffer and generate decisions about a presence of each of multiple service types in the network traffic using a voting algorithm; and reduce fluctuations in the generated decisions using a logic-based stabilizer module to generate a final network service type decision.

In yet another embodiment, a non-transitory computer readable medium includes program code that, when executed by a processor of a device, causes the device to: obtain input features based on network traffic received during a time window; generate multiple network service type predictions about the network traffic during the time window using a ML classification system operating on the input features; store the multiple network service type predictions in different time steps in a FIFO buffer and generate decisions about a presence of each of multiple service types in the network traffic using a voting algorithm; and reduce fluctuations in the generated decisions using a logic-based stabilizer module to generate a final network service type decision.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

Figure 1:
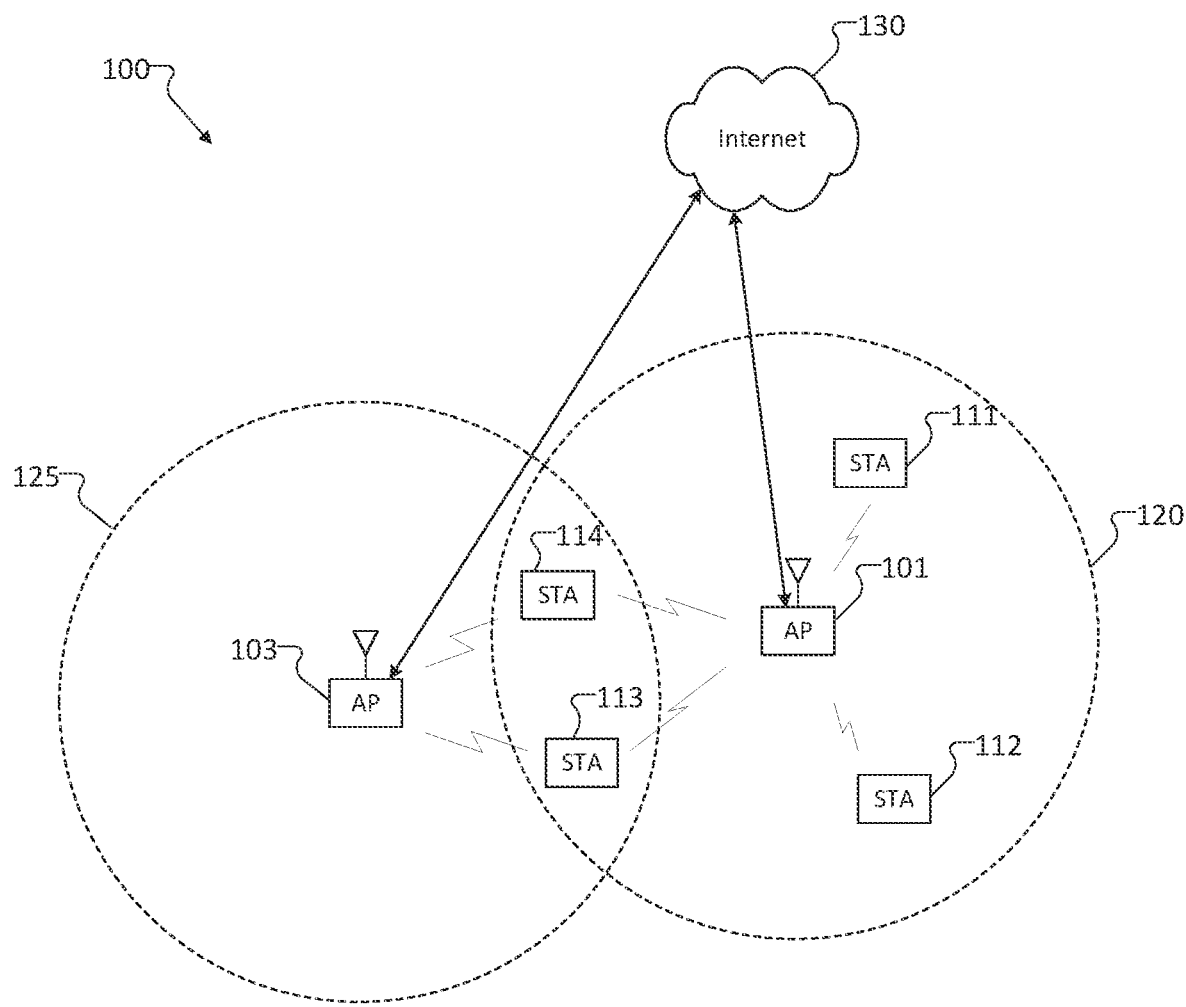
FIG. 1 illustrates an example wireless network according to embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for detecting network services based on network traffic using machine learning. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
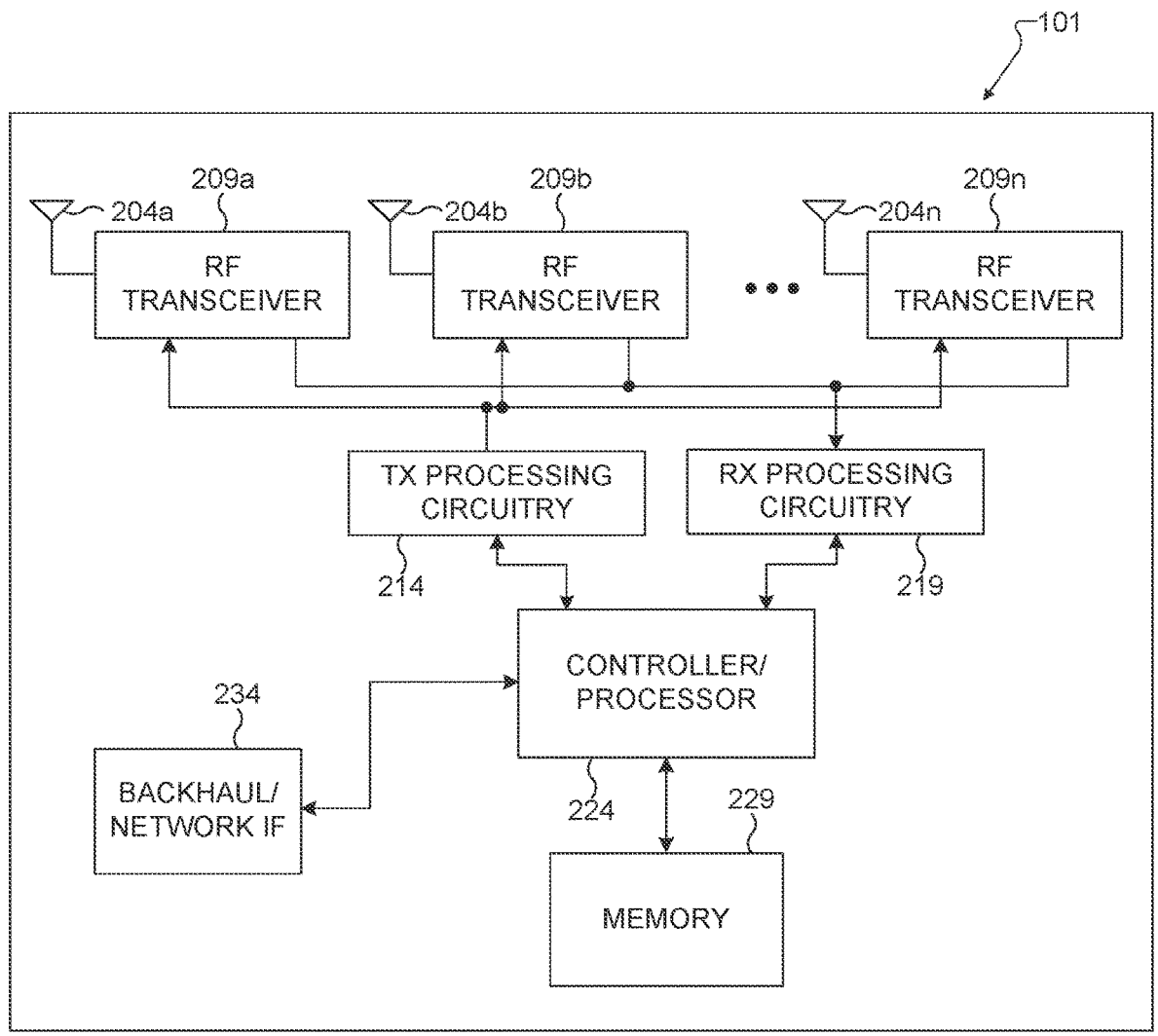
FIG. 2A illustrates an example AP according to embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of uplink channel signals and the transmission of downlink channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including determining parameters for TWT operations. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for detecting network services based on network traffic using machine learning. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
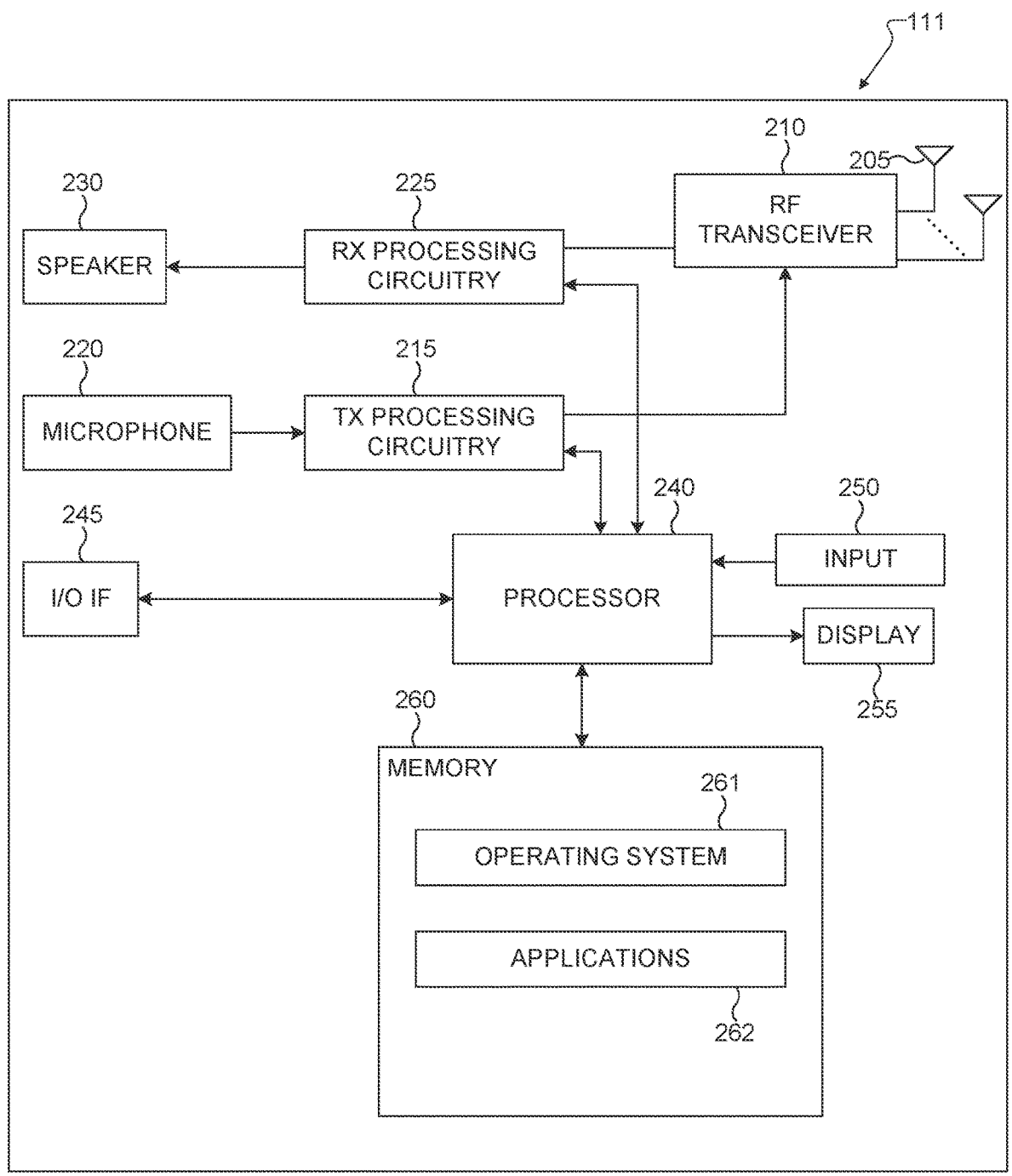
FIG. 2B illustrates an example STA according to embodiments of the present disclosure.

FIG. 2B illustrates an example STA 111 according to various embodiments of this disclosure. The embodiment of the STA 111 illustrated in FIG. 2B is for illustration only, and the STAs 112-114 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of downlink channel signals and the transmission of uplink channel signals by the RF transceiver 210, the RX processing circuitry 225, and the TX processing circuitry 215 in accordance with well-known principles. The main controller/processor 240 can also include processing circuitry configured to detect network services based on network traffic using machine learning. In some embodiments, the controller/processor 240 includes at least one microprocessor or microcontroller.

The controller/processor 240 is also capable of executing other processes and programs resident in the memory 260, such as operations for determining parameters for TWT operations in WLANs. The controller/processor 240 can move data into or out of the memory 260 as required by an executing process. In some embodiments, the controller/processor 240 is configured to execute a plurality of applications 262, such as applications for determining an idle or active state of the Wi-Fi link and determining TWT parameters such as the TWT interval for TWT operation. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

In wireless communication, it is often necessary or desirable to identify the type of services presented in a network traffic stream. Being able to detect the service type of traffic flows is important to a wide range of applications, such as controlling 802.11ax Target Wake Time functions, dynamic scheduling, quality of service assurance, abnormality detection, and the like. Some conventional approaches relying on deep packet inspection (DPI) and packet port numbers have become less feasible since modern network traffic is often encrypted.

An additional issue is the problem of identifying multiple types of services in a stream. A network stream sometimes can contain not just one type of service, but multiple types. For example, consider a scenario where a user interacts with the user's mobile device. The user may be downloading a large file and making an internet phone call simultaneously. In this scenario, the network stream contains two types of services. Conventional approaches cannot identify multiple service types in a stream. Therefore, new methods need to be developed to support the detection of multiple services. Being able to do this will enable more applications and functionalities, such as service prioritization, traffic throttling, power management, and the like.

To address these and other issues, this disclosure provides a system and method for detecting network services based on network traffic using machine learning. As described in more detail below, the disclosed embodiments utilize machine learning (ML) based techniques that can extract features from the packet information and map the traffic pattern to the correct service categories. The ML-based techniques can operate on traffic information, packet timing information, and sensor information as inputs, and output one or more detected network service types. The detected network service type(s) can then be used for a wide range of applications such as controlling 802.11ax Target Wake Time function, dynamic scheduling, quality of service ensuring, abnormality detection, and the like.

Note that while some of the embodiments discussed below are described in the context of 802.11ax Target Wake Time systems, these are merely examples. It will be understood that the principles of this disclosure may be implemented in any number of other suitable contexts or systems.

Figure 3:
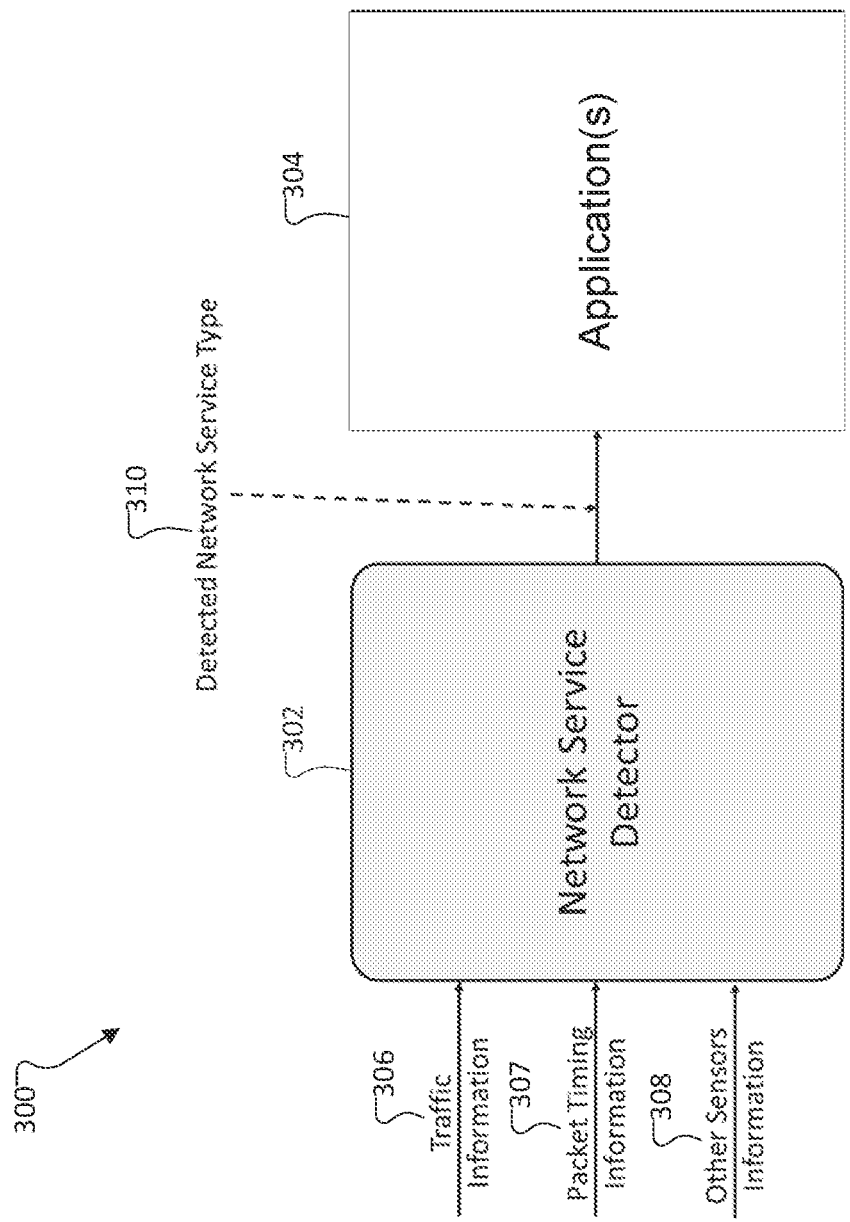
FIG. 3 illustrates details of an example system architecture for detecting network services based on network traffic using machine learning according to embodiments of the present disclosure.

FIG. 3 illustrates details of an example system architecture 300 for detecting network services based on network traffic using machine learning according to embodiments of the present disclosure. For ease of explanation, the architecture 300 will be described as being implemented by a STA, such as one of the STAs 111-114 in the network 100 of FIG. 1. However, the architecture 300 can be implemented by any suitable device. The embodiment of the architecture 300 shown in FIG. 3 is for illustration only. Other embodiments of the architecture 300 could be used without departing from the scope of this disclosure.

As shown in FIG. 3, the architecture 300 includes a machine learning-based network service detector 302 and one or more applications 304. As described in greater detail, the network service detector 302 obtains various information from the network 100, such as traffic information 306, packet timing information 307, and other sensor information 308. The network service detector 302 uses the obtained information 306-308 as inputs to one or more ML algorithms, which process the obtained information 306-308 to output one or more detected network service types 310. The detected network service type(s) 310 can then be provided to the applications 304, such as controlling 802.11ax Target Wake Time function, dynamic scheduling, quality of service ensuring, abnormality detection, and the like.

The network service detector 302 operates to classify different service types so that the detected service can be mapped to the latency requirement. The definition of the service type is important to the performance of the network service detector 302. On one hand, applications in the same service need to have similar latency requirement so that the classification is meaningful. On the other hand, the applications assigned to the same service type need to contain clear common signatures, so that the detection accuracy could be high enough.

Figure 4:
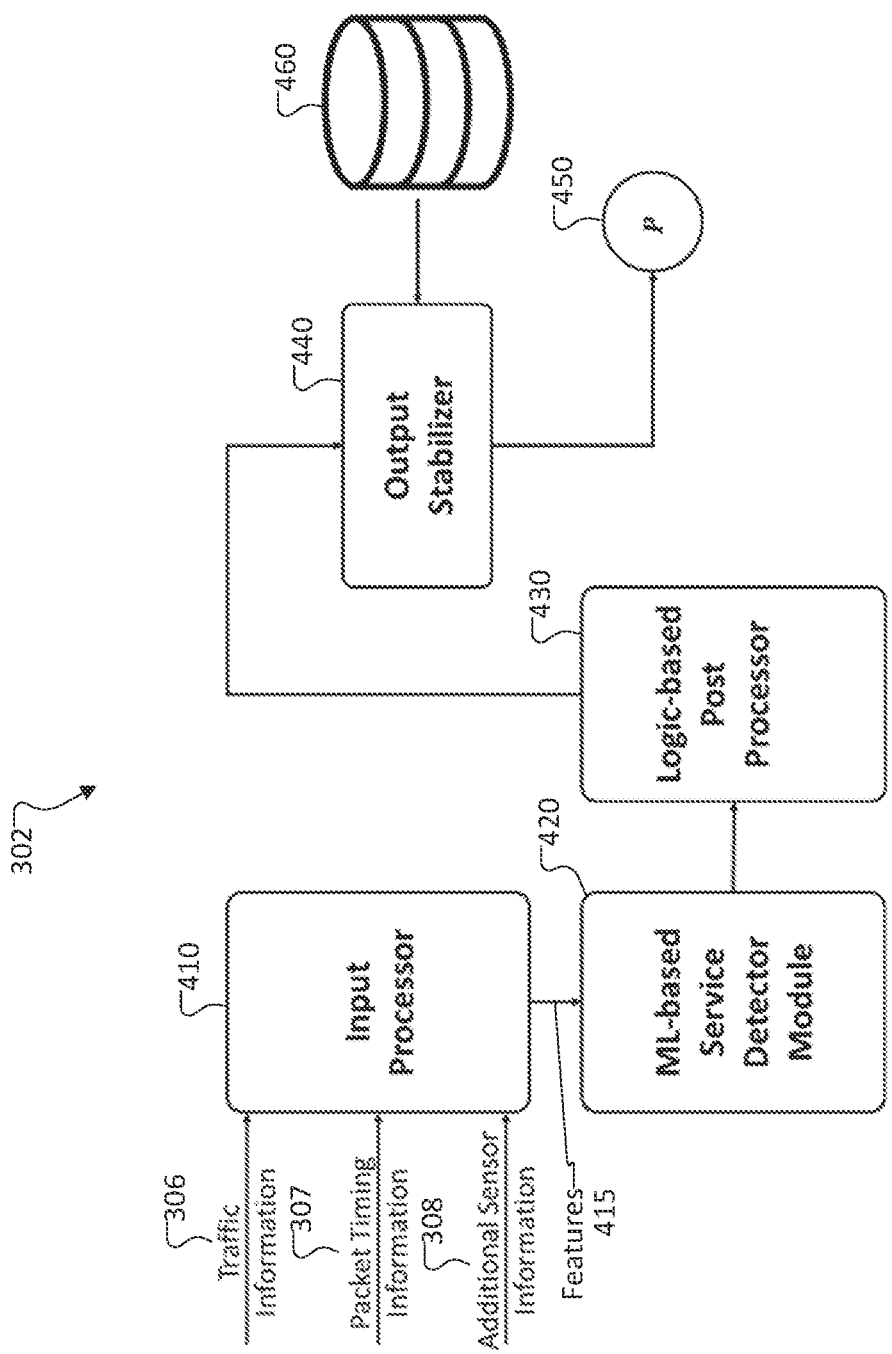
FIG. 4 illustrates additional details of a network service detector according to embodiments of the present disclosure.

FIG. 4 illustrates additional details of the network service detector 302 according to embodiments of this disclosure. As shown in FIG. 4, the network service detector 302 includes multiple modules, including an input processor 410, a ML service detector module 420, a post processor 430, and an output stabilizer 440. The output of the output stabilizer 440 is one or more predictions 450. The output stabilizer 440 can also utilize one or more databased 460 (either local or online) that store known applications which are labeled with the type of service. A decision can be reached with the consultation of the database 460 in the case of fluctuation.

Input Processor 410

To detect the type of predefined network services in a data stream, the network service detector 302 groups together applications that have similar latency requirement and data characteristics to form a service type (such as video call, audio call, streaming, etc.). The network service detector 302 identifies the patterns in the traffic stream via the input features and maps the patterns to the detected service(s). Therefore, input formulation for the network service detector 302 is an important step to achieve high performance.

The input processor 410 operates to form appropriate input for the service detector module 420 from the network traffic stream. To do this, the input processor 410 uses a set of network traffic features 415 to help classify the categories which are computed over a duration of a certain milliseconds of network flow. This time duration is defined as a burst b. In some embodiments, the default value of b is 500 ms, although this is merely one example; other durations are within the scope of this disclosure. These features 415 are obtained based on the traffic information 306, the packet timing information 307, and the sensor information 308. In some embodiments, the features 415 can include, but are not limited to, any one or more of the following:

Uplink maximum inter-arrival time: the maximum time difference between arrival of one packet and the next packet within a burst (1 value).

Uplink average inter-arrival time: the average time difference between arrival of one packet and the next packet within a burst (1 value).

Uplink & downlink packet counts: The uplink and downlink number of packets within a burst (2 values).

Uplink & downlink minimum packet size: The uplink and downlink minimum packet size in Mb within a burst (2 values).

Uplink & downlink maximum packet size: The uplink and downlink maximum packet size in Mb within a burst (2 values).

Uplink & downlink average packet size: The uplink and downlink average packet size in Mb within a burst (2 values).

Uplink & downlink UDP packet counts: The uplink and downlink User Datagram Protocol (UDP) number of packets within a burst (2 values).

Uplink & downlink TCP packet counts: The uplink and downlink Transmission Control Protocol (TCP) number of packets within a burst (2 values).

In some embodiments, in addition to those described above, the network traffic features 415 can include any one or more of the following:

Difference of uplink & downlink packet counts: The difference between the packet count of uplink and downlink within a burst (1 value).

Difference of uplink & downlink minimum packet size: The difference between the minimum packet size of uplink and downlink in Mb within a burst (1 value).

Difference of uplink & downlink maximum packet size: The difference between the maximum packet size of uplink and downlink in Mb within a burst (1 value).

Difference of uplink & downlink UDP packet counts: The difference between the uplink and downlink User Datagram Protocol number of packets within a burst (1 values).

Difference of uplink & downlink TCP packet counts: The difference between the uplink and downlink Transmission Control Protocol number of packets within a burst (1 values).

Difference of uplink & downlink average packet size: The difference between the average packet size of uplink and downlink in Mb within a burst (1 value).

Uplink & downlink average throughput: The uplink and downlink average packet throughput in Mb within a burst (2 values).

Uplink & downlink minimum throughput: The uplink and downlink minimum packet throughput in Mb within a burst (2 values).

Uplink & downlink maximum throughput: The uplink and downlink maximum packet throughput in Mb within a burst (2 values).

Application power consumption: running application power consumption value. (multiple values; one value for each application that is running).

Touch screen interaction: The user's touch screen interaction counts during a burst. (1 value).

Peripheral usage: A table that store multiple flags that indicate whether the peripherals of the user equipment such as touch screen, speaker, microphone, etc. are being used (multiple values).

Uplink UDP packet maximum inter-arrival time: the maximum time difference between arrival of one UDP packet and the next UDP packet within a burst (1 value).

Uplink TCP packet maximum inter-arrival time: the maximum time difference between arrival of one TCP packet and the next TCP packet within a burst (1 value).

Uplink average inter-arrival time for UDP packet: the average time difference between arrival of one UDP packet and the next UDP packet within a burst (1 value).

Uplink average inter-arrival time for TCP packet: the average time difference between arrival of one TCP packet and the next TCP packet within a burst (1 value).

These additional features can help identify the patterns in the network flow and boost the performance of the finer classifiers (described below) in identifying the services.

In some embodiments, the TCP and UDP packets are separated to help with identifying services such as real-time (RT) services and non-real-time (NRT) services. NRT services usually use TCP and RT services usually use UDP, because UDP does not have the retry and other congestion control measures to ensure low latency.

Figure 5:
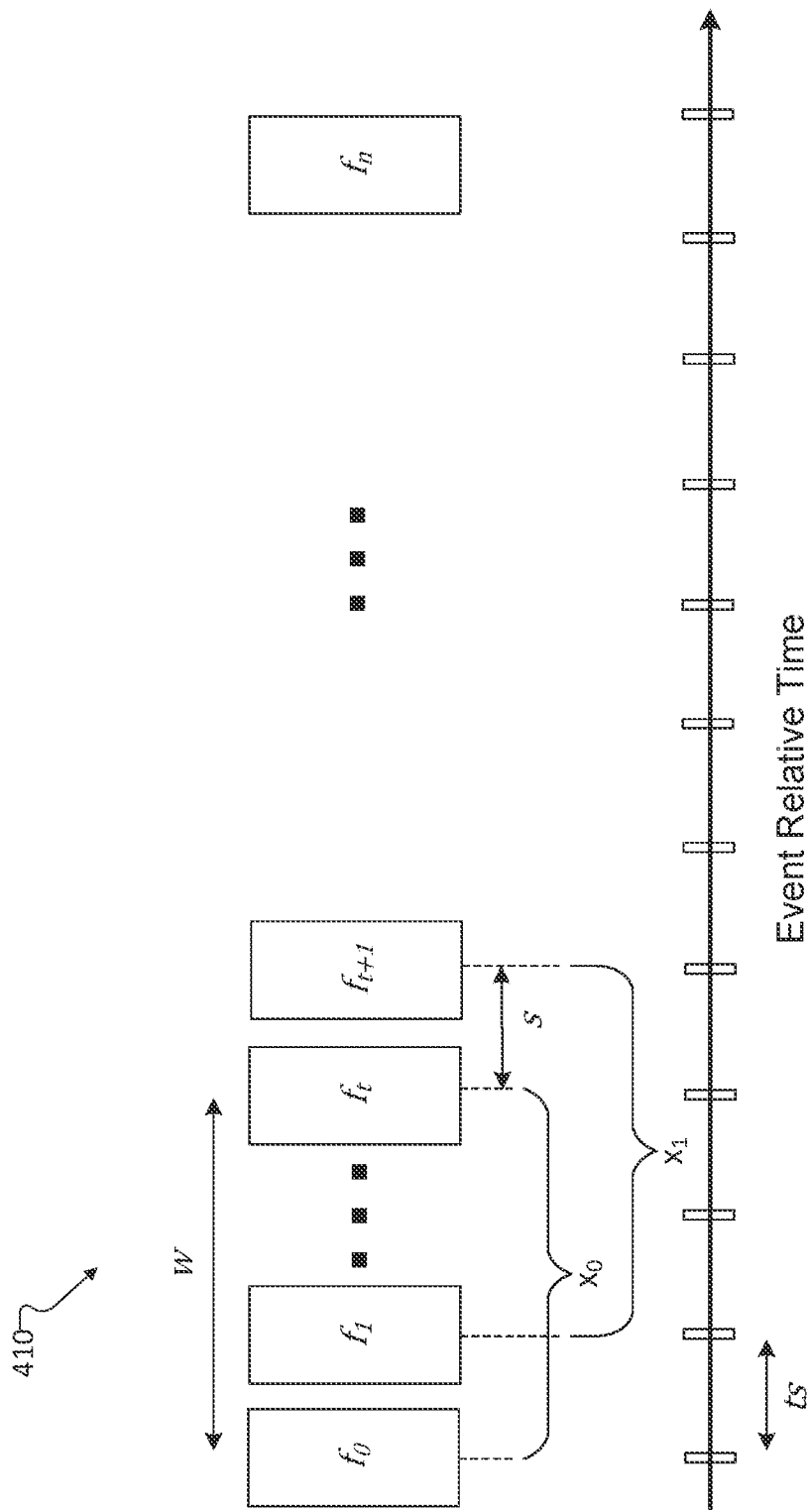
FIG. 5 illustrates an example of an input formulation for use by an input processor according to embodiments of the present disclosure.

FIG. 5 illustrates an example of the input formulation for use by the input processor 410 according to embodiments of this disclosure. As shown in FIG. 5, a time window having a size of w (in milliseconds) is used to slide along the sequence with a stride/moving step of s time steps to form the input. Each time step has a duration of ts (in milliseconds). In some examples, the moving step of s and the time step ts may equal 500 ms, although other values may be possible in other examples. Furthermore, in some examples, the moving step of s does not need to be equal to the time step ts.

At time t, the input $x_t$ includes a combination of multiple feature vectors $$[f_{t-(\frac{w}{ts}-1)}, \ldots, f_t].$$

For example, a sequence of 3 seconds (3000 milliseconds) can be used. This means that the total number of time steps for each input is $$\frac{3000 \text{ ms}}{500 \text{ ms}} = 6.$$

Therefore, the input $x_t$ at time t includes the following six feature vectors $[f_{t-5}, f_{t-4}, f_{t-3}, f_{t-2}, f_{t-1}, f_t]$, representing the features 415.

Service Detector Module 420

The service detector module 420 is a ML-based multi-label classifier module that operates to detect the traffic pattern in the network traffic stream and label the services. The service detector module 420 obtains input features based on the network traffic stream received in the pre-defined time window. The service detector module 420 then determines network service type(s) in the network traffic stream.

Figure 6:
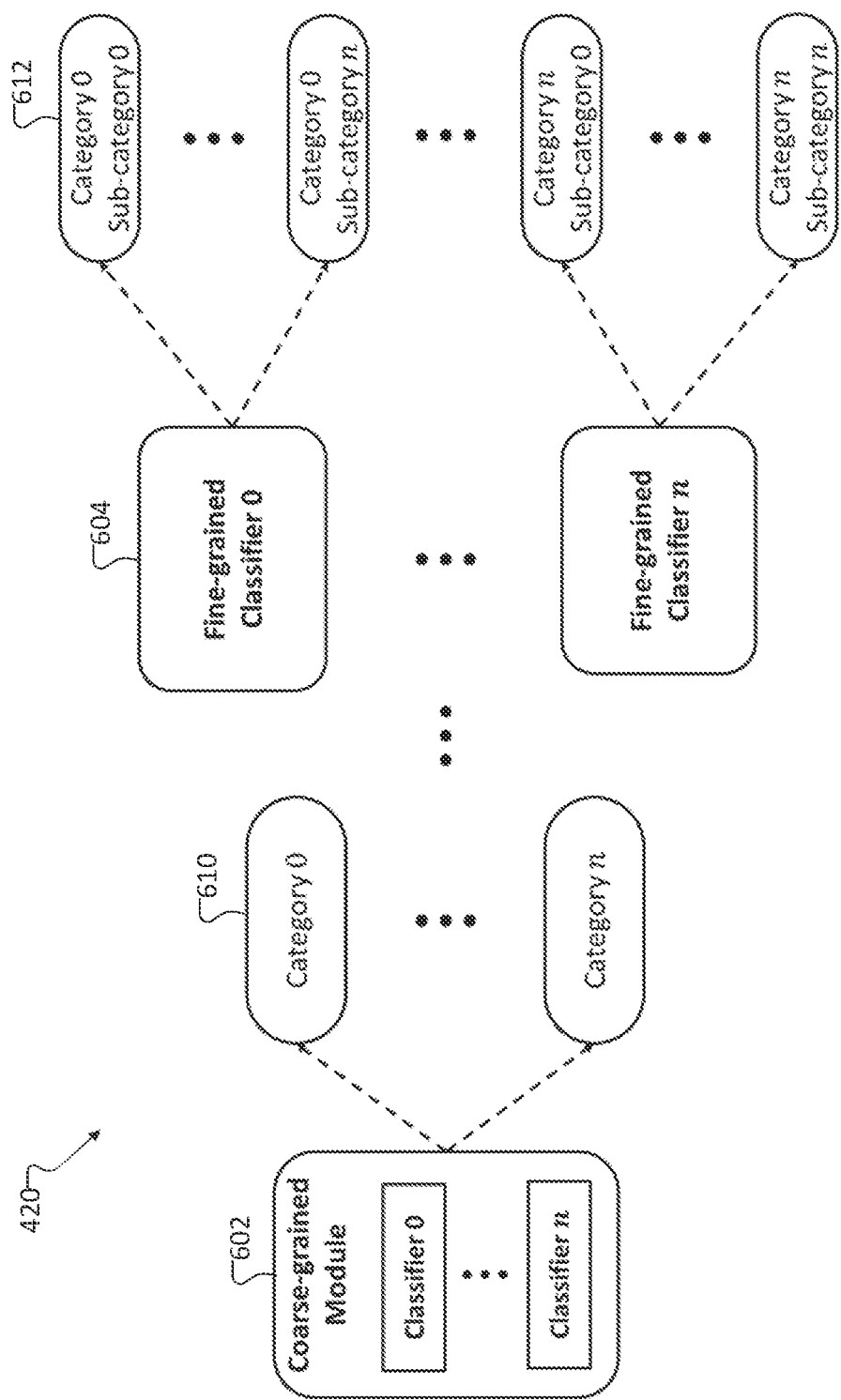
FIG. 6 illustrates additional details of a service detector module according to embodiments of the present disclosure.

FIG. 6 illustrates additional details of the service detector module 420 according to embodiments of this disclosure. As shown in FIG. 6, the service detector module 420 includes multiple layers of classifiers, including a coarse grain classifier 602 and one or more fine grain classifiers 604, to increase the effectiveness of the ML multi-label classification.

The coarse grain classifier 602 operates to classify the service types into multiple categories 610. The coarse grain classifier 602 achieves a rough range of the requirements with strong signature (i.e., the network traffic belonging to each of the service types in the coarse grain classifier 602 should have highly distinguishable characteristics from each other). For example, in the real-time service type, uplink and downlink traffic should have more activities, compared to traffic that is from the non-real-time service type.

After the coarse grain classifier 602 classifies the service types into multiple categories 610, the fine grain classifiers 604, which can include multiple sub-classifiers, perform fine grain classifying on the results from the coarse grain classifier 602. The service types in the fine grain classifiers 604 should have less obvious traffic characteristics that can be used to distinguish from one category to another. The goal is to achieve a finer range of requirement if possible. In some embodiments, the fine grain classifiers 604 further divide the categories 610 into sub-categories 612.

The coarse grain classifier 602 and each of the fine grain classifiers 604 can be a multi-label ML classifier. Consequently, the network service detector 302 can use multi-label classification to work with both single-service and mixed-service signals (e.g., where multiple service types occur at the same time). In some embodiments, the multi-label ML classifier (e.g., the coarse grain classifier 602 or the fine grain classifiers 604) can be designed using a single classifier that can generate multiple outputs. An output of the multi-label ML classifier is a one-dimensional vector that has the size of the number of defined service types. If a service type is detected, the corresponding field will be activated (e.g., set to 1). Otherwise, it will be deactivated (e.g., set to 0). Neural network based algorithms can be used to implement the single classifier with multi-label output.

Figure 7:
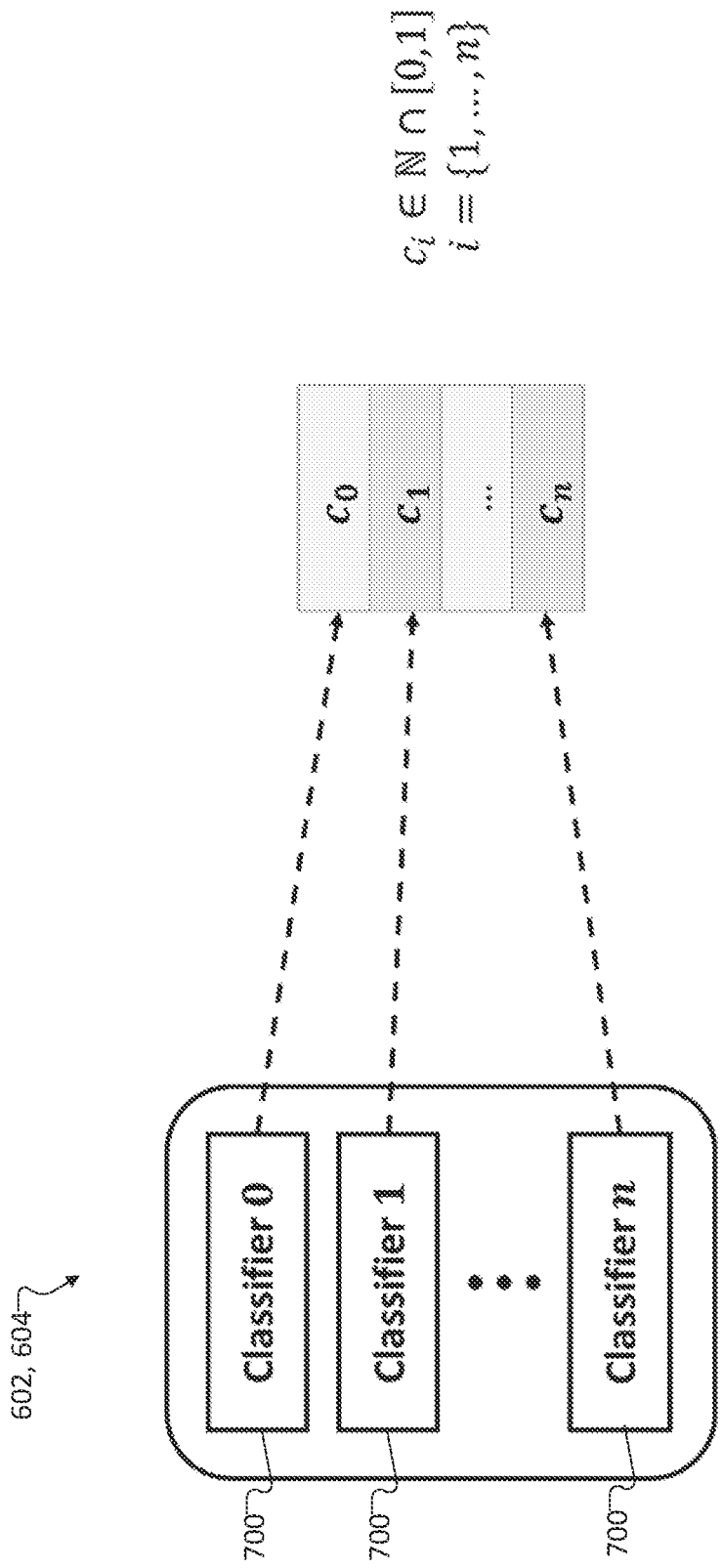
FIG. 7 illustrates an example implementation of a coarse grain classifier or fine grain classifiers using multiple binary classifiers according to embodiments of the present disclosure.

In other embodiments, multiple binary classifiers can be used to create the ML multi-label classifier. FIG. 7 depicts an example implementation of the coarse grain classifier 602 or one of the fine grain classifiers 604 using multiple binary classifiers 700 according to embodiments of the present disclosure. In some embodiments, the number of classifiers 700 can correspond to the number of defined service types. Any suitable type of binary classifier algorithm, such as multi-layer perceptron, logistic regression, support vector machine, decision tree, etc., can be used for the classifiers 700.

Figure 8:
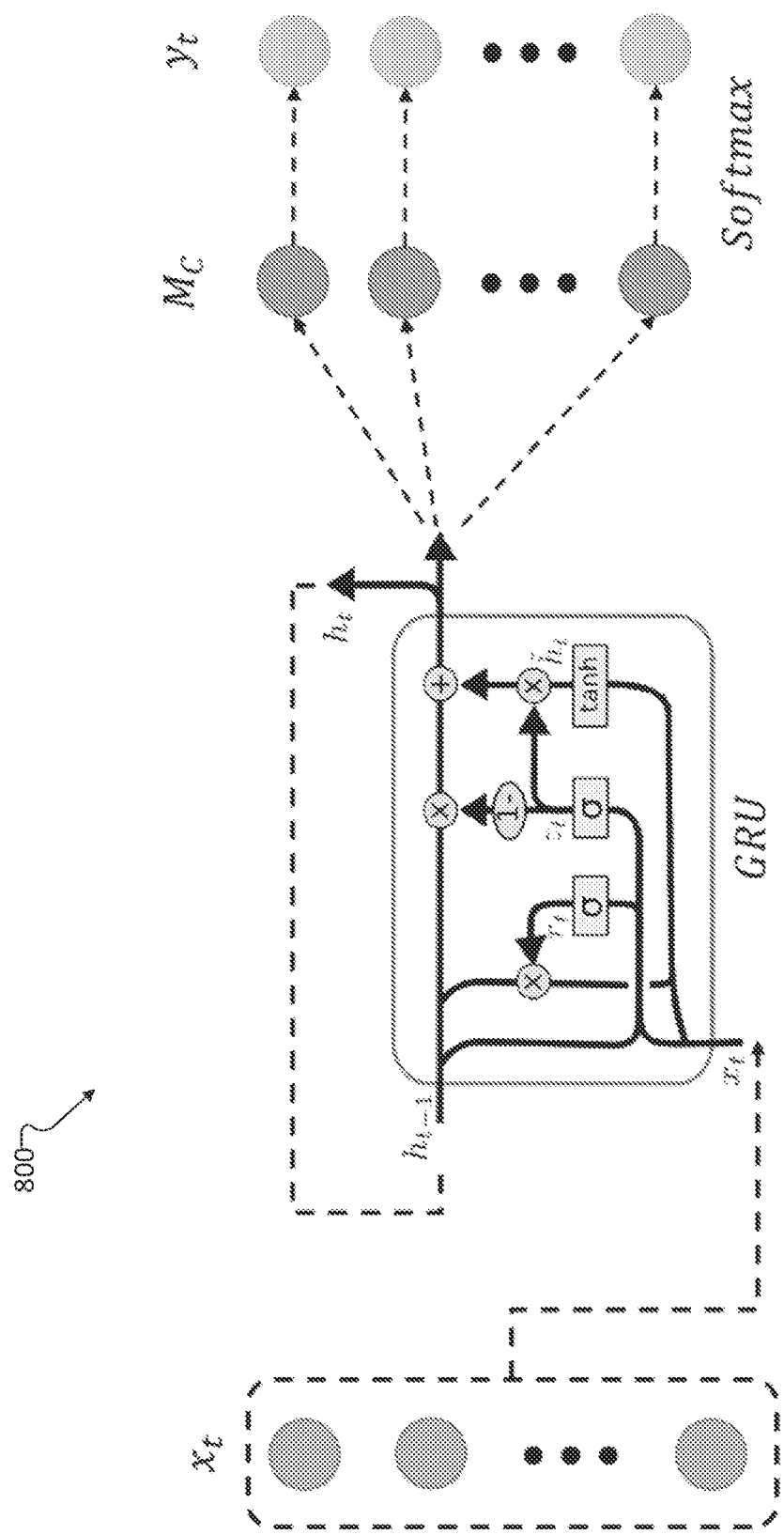
FIG. 8 illustrates an example architecture of a LSTM used to implement a RNN in the service detector module according to embodiments of the present disclosure.

In some embodiments, the classifiers 700 of the coarse grain classifier 602 or the fine grain classifiers 604 can be implemented using different machine learning techniques. Network flow of the services can be collected for the purpose of training and testing the classifiers. In some embodiments, Random Forest (RF) can be used to implement one or more of the coarse grain classifier 602 or the fine grain classifiers 604. In others embodiment, a Recurrent Neural Network (RNN) can be used to implement one or more of the coarse grain classifier 602 or the fine grain classifiers 604. The core of the RNN can be a Long Short-Term Memory (LSTM) Unit or a Gated Recurrent Unit (GRU). For example, FIG. 8 illustrates an example architecture 800 of the LSTM used to implement the RNN in the service detector module 420 according to embodiments of the present disclosure. In the architecture 800, the input to the RNN is a vector that has a shape of [6, 10], for which 6 is the number of time-steps (3 seconds duration) and 10 is the number of features.

Figure 9:
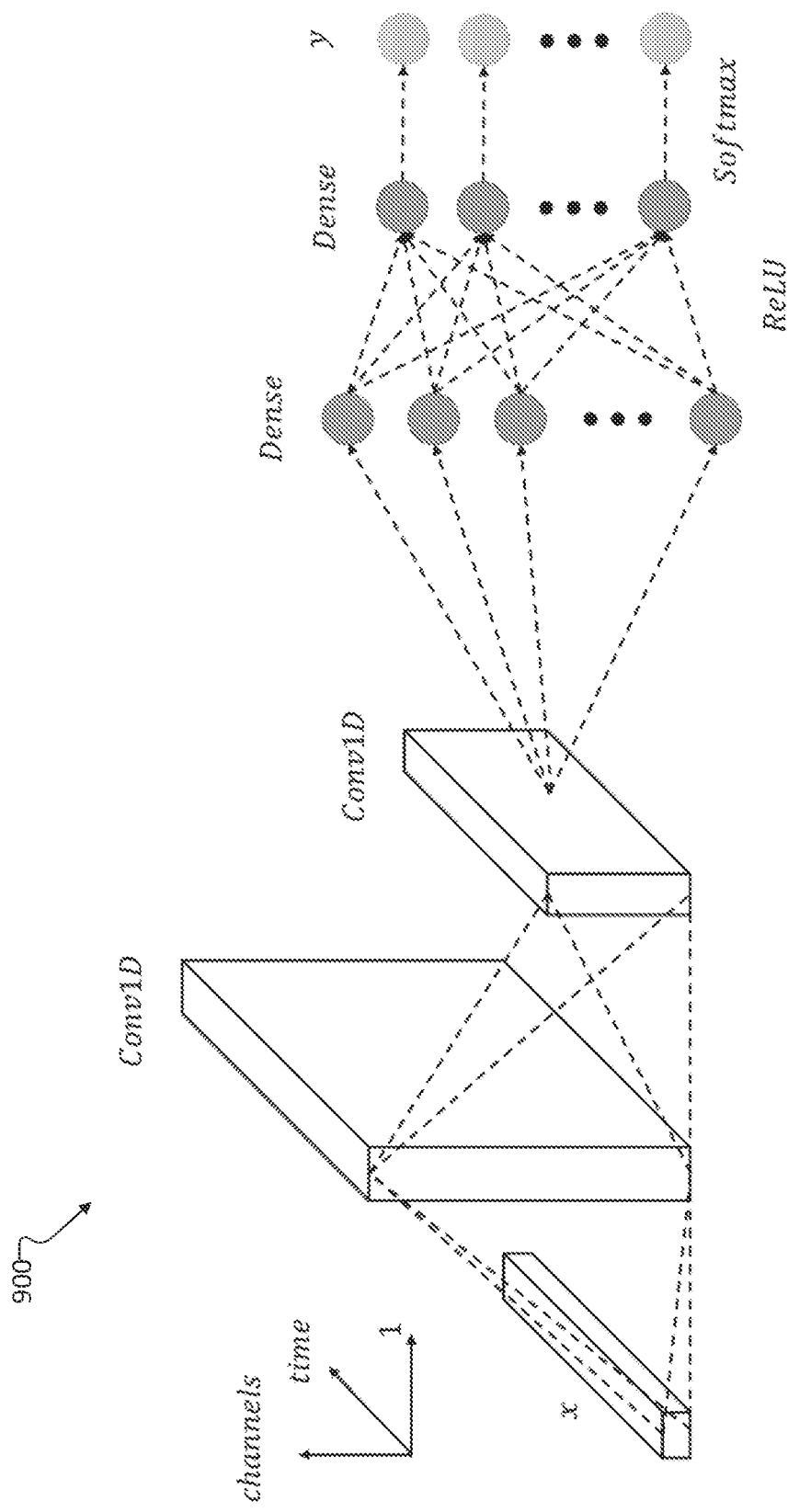
FIG. 9 illustrates an example CNN architecture for use in the service detector module according to embodiments of the present disclosure.

In some other embodiments, a 1D Convolutional Neural Network (CNN) can be used to implement one or more of the coarse grain classifier 602 or the fine grain classifiers 604. FIG. 9 shows an example CNN architecture 900 for use in the service detector module 420 according to embodiments of the present disclosure. In the CNN architecture 900, the convolutional layer is used to convolute along the time dimension. The CNN architecture 900 extracts features from sequences and maps the internal features of the sequence. The CNN architecture 900 is effective for deriving features and analysis of signal data over a fixed-length period.

Overall, if a neural network based algorithm (e.g., RNN, CNN, etc.) is used to implement one or more of the coarse grain classifier 602 or the fine grain classifiers 604, the activation of the last layer of the neural network based algorithm should be a sigmoid function to enable multi-label classification.

Figure 10:
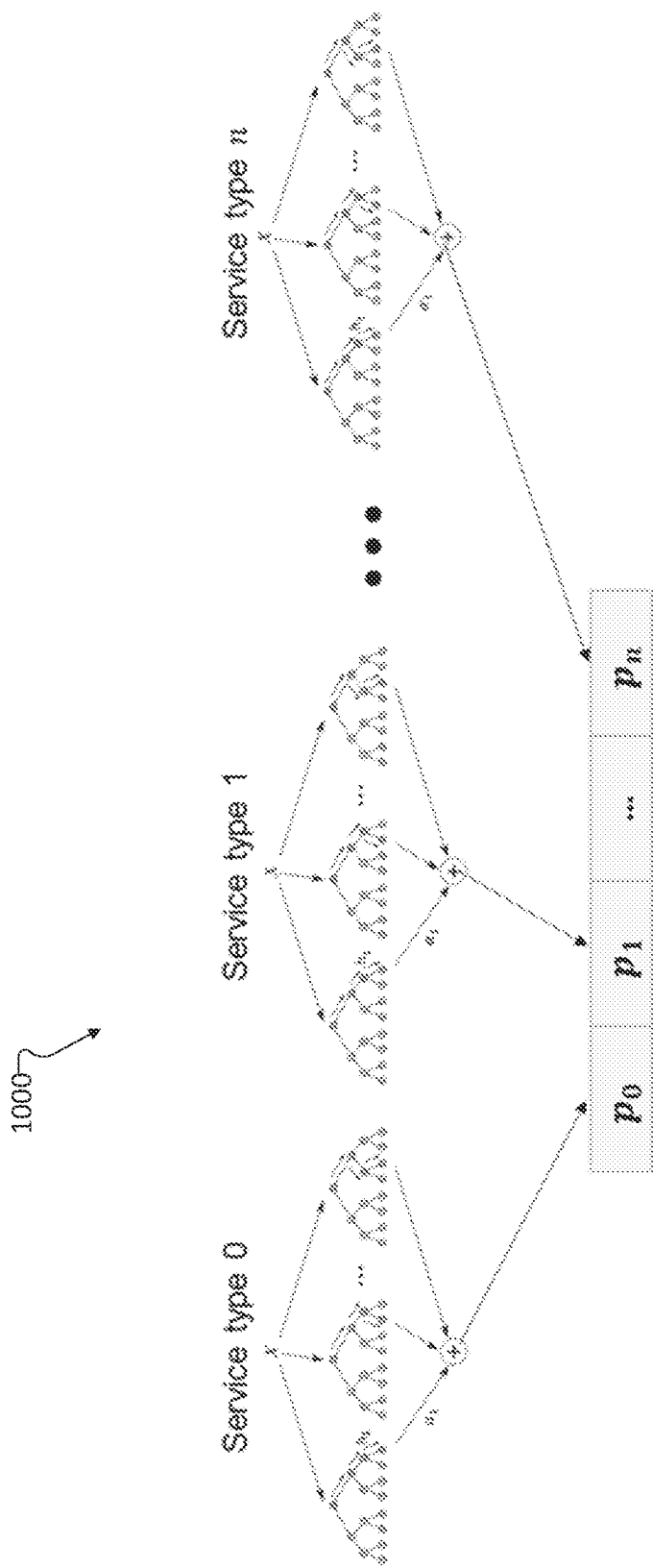
FIG. 10 illustrates an example multi-label XGB architecture for use in the service detector module according to embodiments of the present disclosure.

In other embodiments, a Gradient Boosting (XGB) method can be utilized to implement one or more of the coarse grain classifier 602 or the fine grain classifiers 604. FIG. 10 shows an example multi-label XGB architecture 1000 for use in the service detector module 420 according to embodiments of the present disclosure. In the architecture 1000, there are multiple models, and each model corresponds to each service category and is in charge of determining whether a service is present in the current traffic. In some embodiments, each model outputs a probability prediction p, where, e.g., $p \in [0, 1]$ with $p \leq 0.5$ for the service not present in the signal, and $p > 0.5$ for the service being present in the signal.

In the architecture 1000, the tree structure is used as the base learner, and the same features are used to train the XGB model. A sorting method can be used to avoid the impact of data index in training the XGB model. More specifically, the input features to the XGB model are arranged with a FIFO array. In an example implementation, for a 3 second window of observation data, and 0.5 seconds of observation time resolution, 6 time domain observations of each of 10 network statistics features can be used, which makes the FIFO array a size of 10×6=60. With each new observation every 500 ms, the first 10 data points (the 10 features observed 3 seconds ago) in the FIFO array will be discarded, and the newly observed 10 data points of the 10 features will be attached to the end of the FIFO array.

In this way, the 10 features of a specific observation time point can appear in different locations of the FIFO array, which may hinder the XGB to learn the statistics of the traffic. Thus, the FIFO array can be pre-processed before it is sent to the XGB model for training. Specifically, after each time the FIFO array is updated, each feature is sorted from small to large to help the XGB model to learn the pure statistics of the data without the interference from the location of each observation point in the array. Unlike a neural network base algorithm, for XGB to be able to recognize multiple services, multiple XGB binary classifiers are used to form a multi-label classifier. Additionally or alternatively, other classifier methods can also be used, including Support Vector Machine, K-Nearest Neighbors, Decision Tree, and the like.

Figure 11:
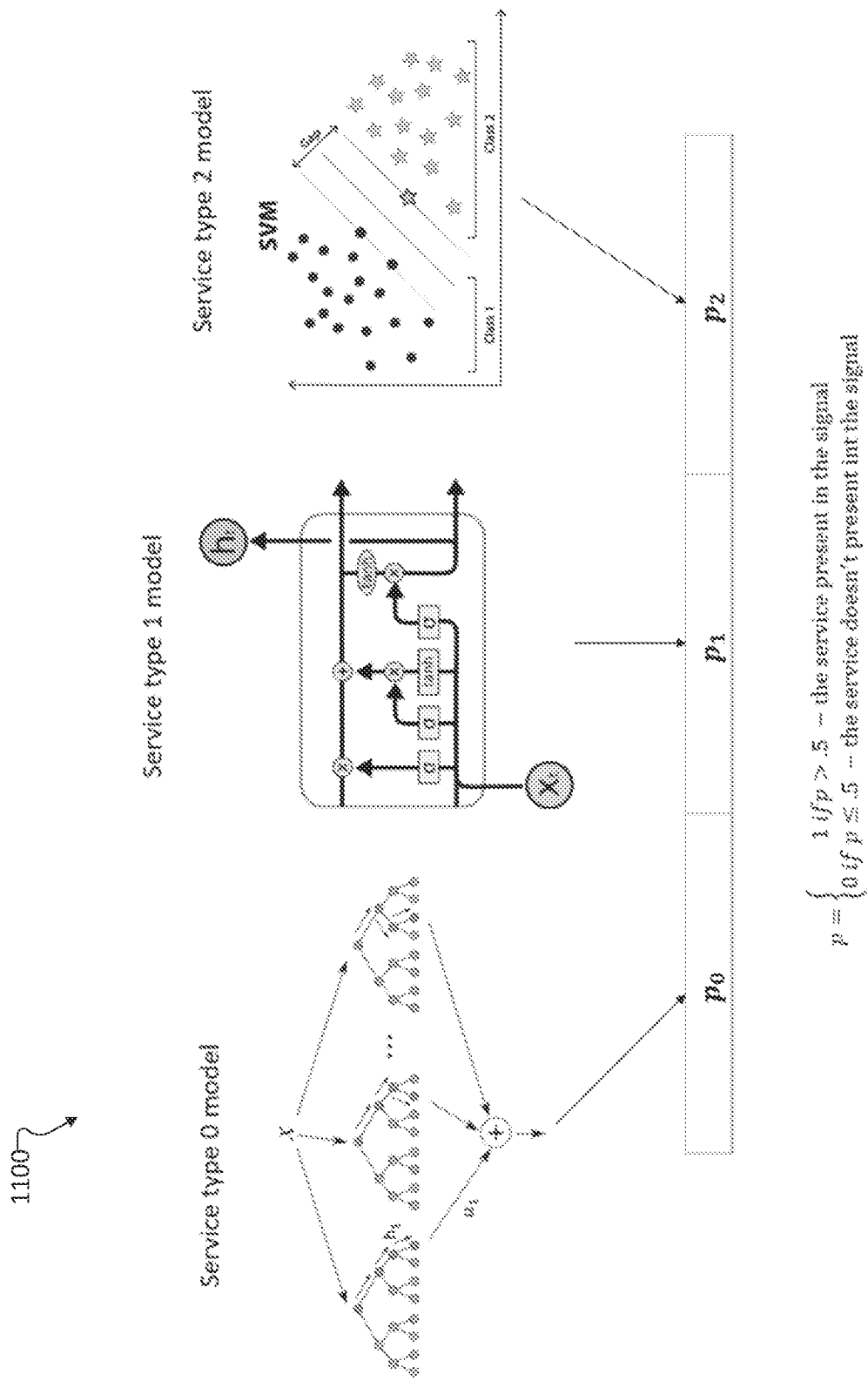
FIG. 11 illustrates an example architecture for use in the service detector module according to embodiments of the present disclosure.

In some embodiments, a mixed combination of RNN, XGB, LSTM, CNN, k-means, support vector machine (SVM), or other ML techniques can be used to implement one or more of the coarse grain classifier 602 or the fine grain classifiers 604. For example, FIG. 11 illustrates an example architecture 1100 for use in the service detector module 420 according to embodiments of the present disclosure. As shown in FIG. 11, the architecture 1100 uses three different ML techniques, including XGB, LSTM, and SVM, to classify the network service type.

In some embodiments, the service detector module 420 can be designed to have only one classifier (e.g., only the coarse grain classifier 602 without the fine grain classifiers 604).

Logic Based Post Processor 430

The post processor 430 operates to store the n most recent past multi-label predictions generated by the service detector module 420 and use this information to generate a decision accordingly (n is empirically determined to work with the specific application, but the default value is 5). The post processor 430 functions as a voting system and has n buffer slots (in a FIFO buffer) corresponding to n time steps, from the current time step to the n time step in the past. Since this is a multi-label system, the post processor 430 also stores multi-label predictions.

Figure 12:
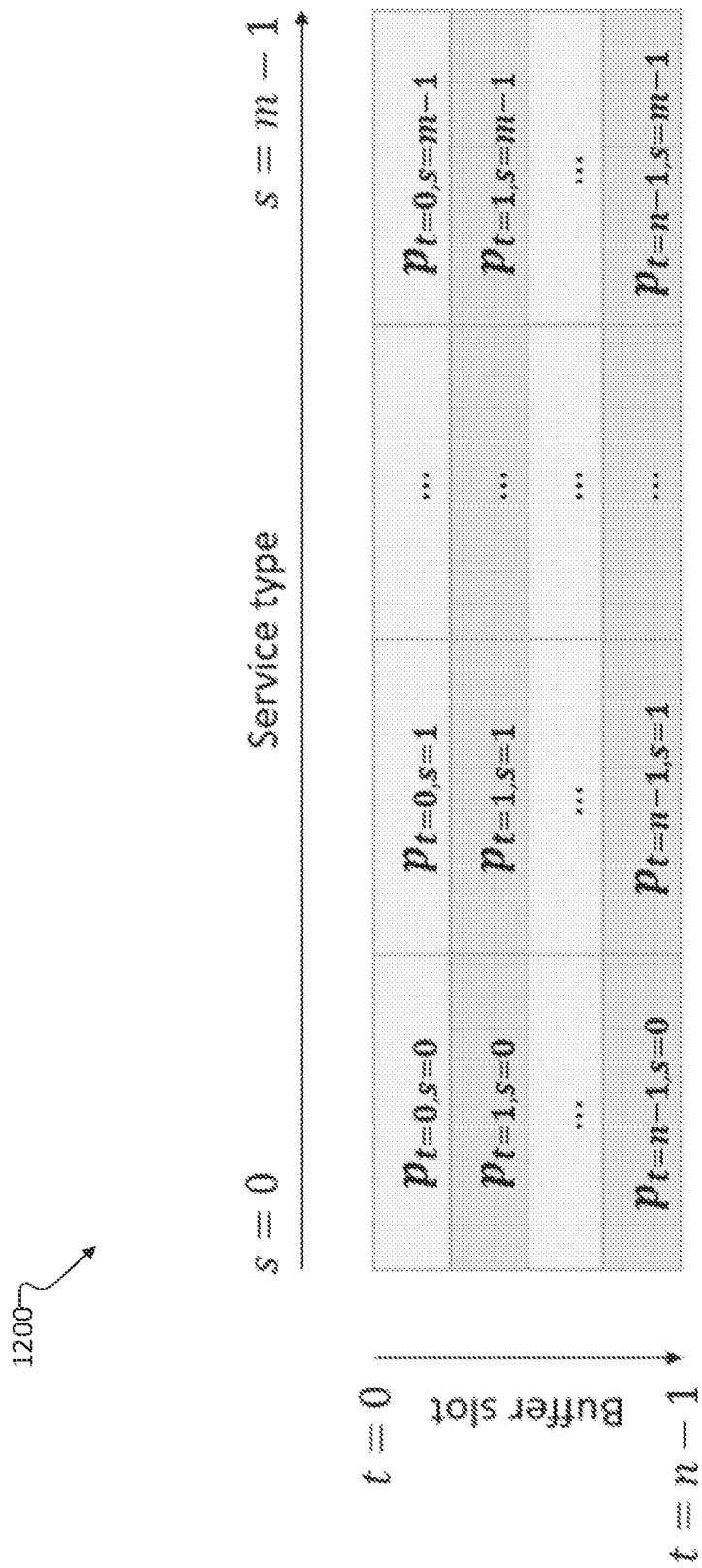
FIG. 12 illustrates an example buffer for use in a post processor according to embodiments of the present disclosure.

FIG. 12 illustrates an example buffer 1200 for use in the post processor 430 according to embodiments of the present disclosure. As shown in FIG. 12, the buffer 1200 is in the form of a table. Each column can be thought as one individual buffer for the corresponding service. In the buffer 1200, n is the size of the buffer, and m is the number of the service types. Since the buffer 1200 is designed as a FIFO buffer, the buffer slot t=0 has the most recent prediction. The decision of whether each service type is present in the signal is determined by applying the pre-processing scheme.

Figure 13:
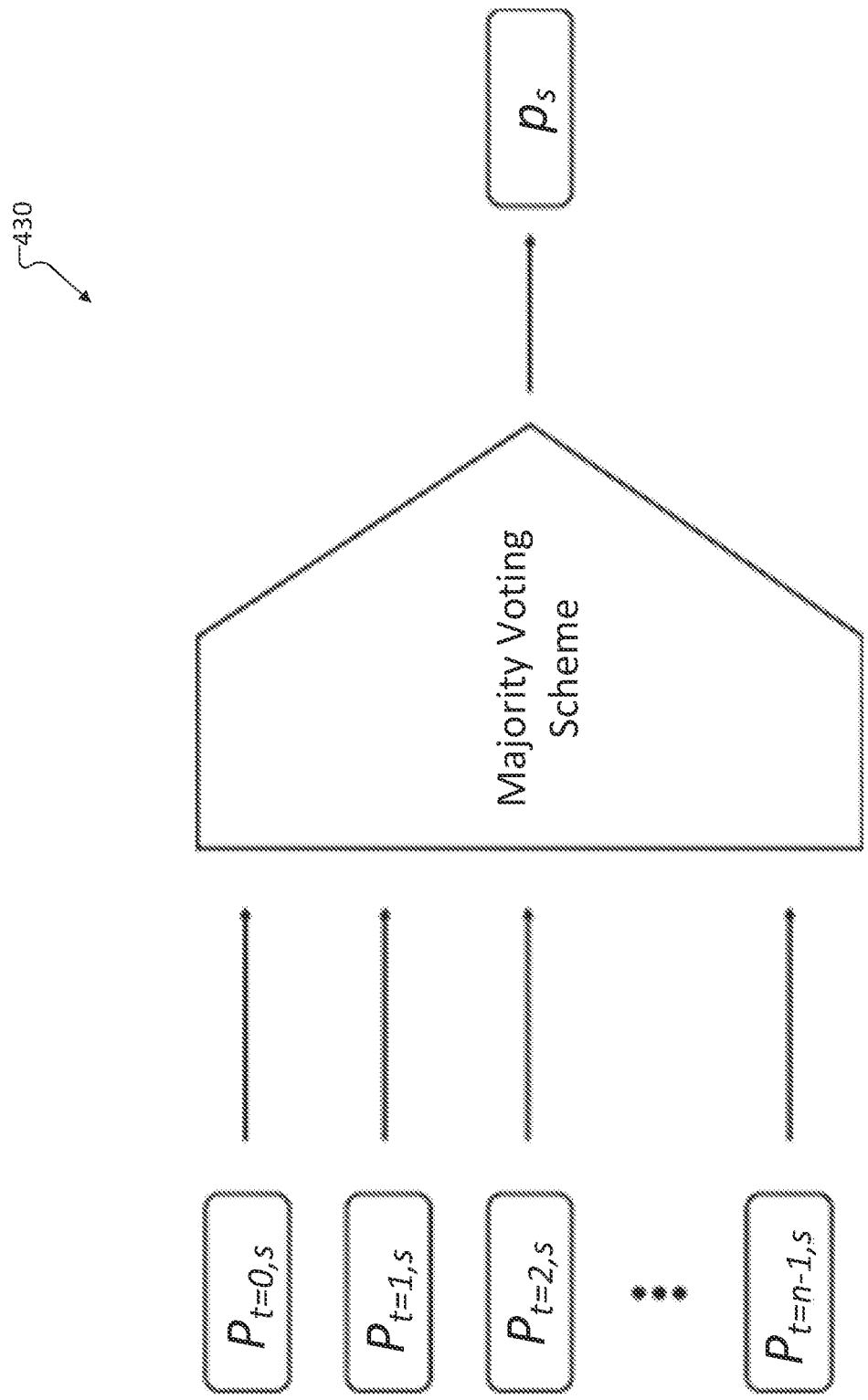
FIGS. 13 through 16 illustrate examples of the post processor implemented using different schemes or models according to embodiments of the present disclosure.

In some embodiments, the post processor 430 can be configured to perform a majority voting decision to adopt the class labels that are voted for the most to be the final decision. FIG. 13 illustrates an example of the post processor 430 implemented using the majority voting scheme according to embodiments of the present disclosure. The decision of whether each service is present in the signal is determined as:

$$d_{s \in [0, m-1]} = \max(\text{count\_zero}(P=(p_{0,s}, \ldots, p_{n-1,s})), \text{count\_nonzero}(P=(p_{0,s}, \ldots, p_{n-1,s}))).$$

Figure 14:
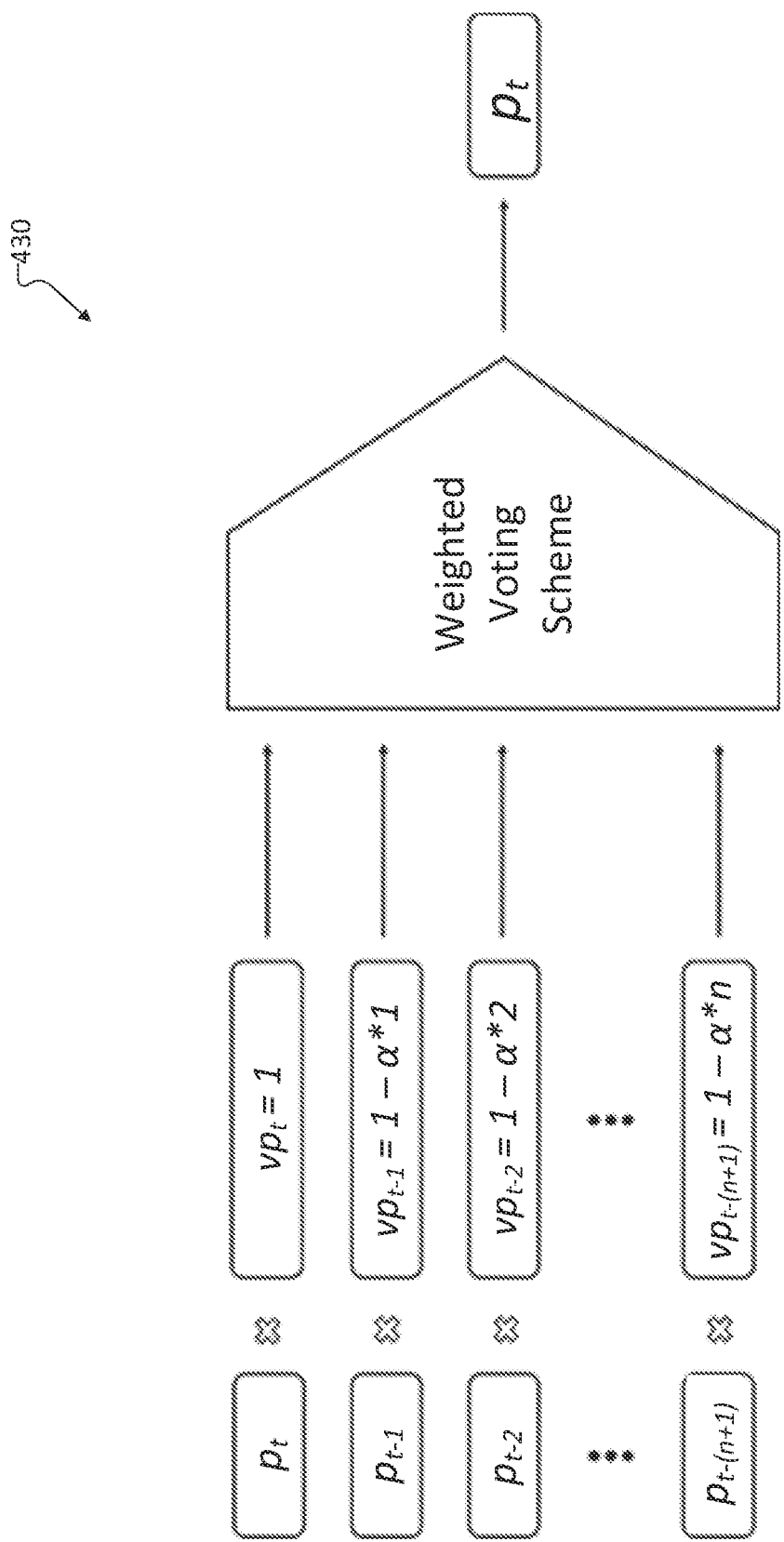

In other embodiments, the post processor 430 can be configured to perform a weighted voting scheme. Unlike the majority voting scheme shown in FIG. 13, this voting scheme gives a voting power to each vote or raw prediction. FIG. 14 illustrates an example of the post processor 430 implemented using the weighted voting scheme according to embodiments of the present disclosure. In FIG. 14, the most recent raw prediction is given the most voting power vp, and the following raw predictions at the previous time steps decay at a rate determined by a hyper-parameter a (a is empirically determined to work with the specific application, but the default value is 0.1). Raw predictions from the farther past have less voting power compared to the most recent ones.

Figure 15:
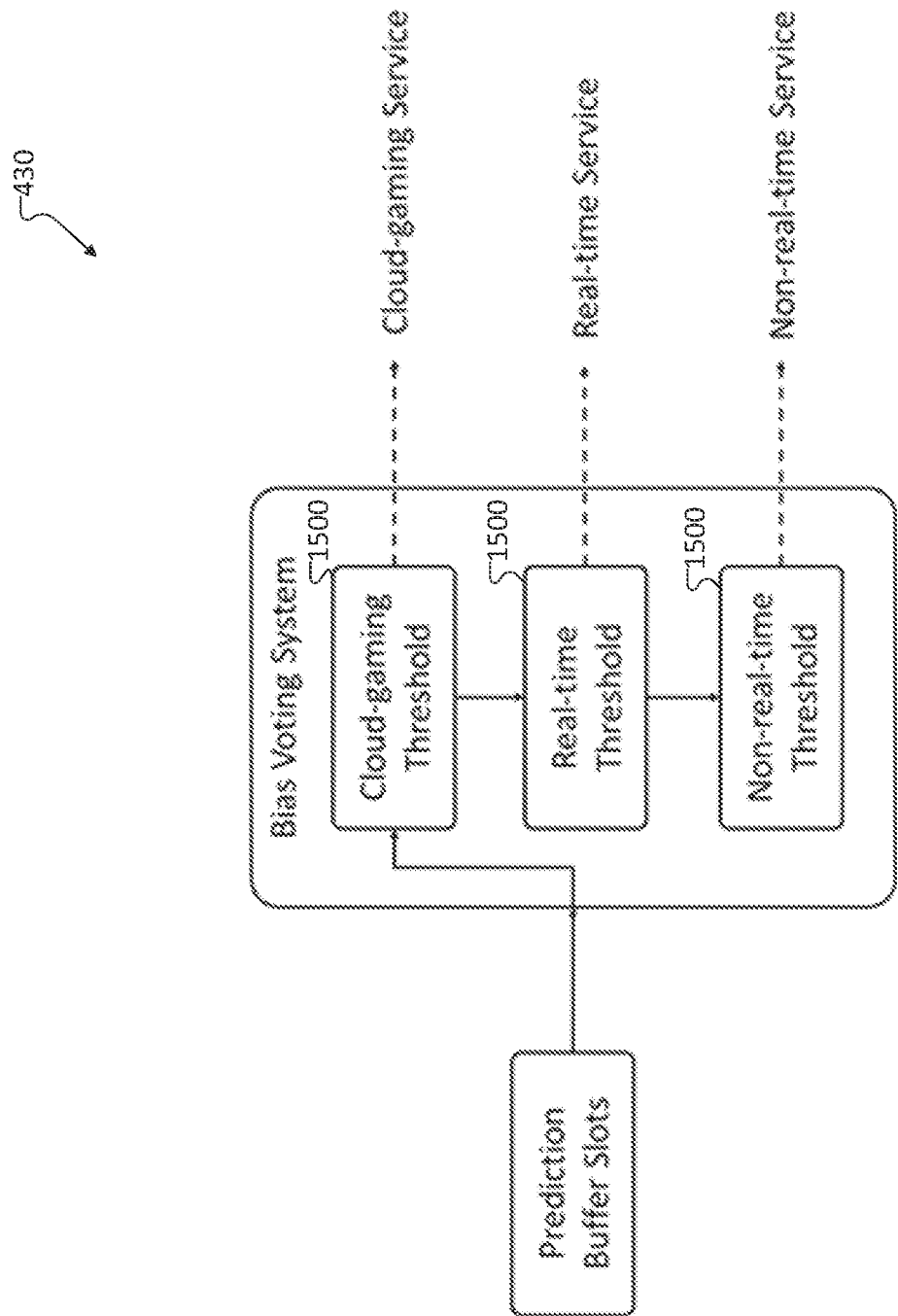

In still other embodiments, the post processor 430 can be configured to perform a bias voting scheme. FIG. 15 illustrates an example of the post processor 430 implemented using the bias voting scheme according to embodiments of the present disclosure. In bias voting, there are multiple threshold filters corresponding to the number of the defined services. For example, in FIG. 15, there are three threshold filters 1500 for three defined services. The decision starts at the most demanding service threshold in term of latency requirement (e.g., cloud gaming services are more demanding than real-time and non-real-time services, as cloud gaming services require smaller latency than the other service types), which requires the lowest threshold (i.e., the least number of detections in the n buffer slots). The decision continues to pass the multi-stacks threshold system until it passes one of the thresholds, which means the decision is that corresponding service type.

Figure 16:
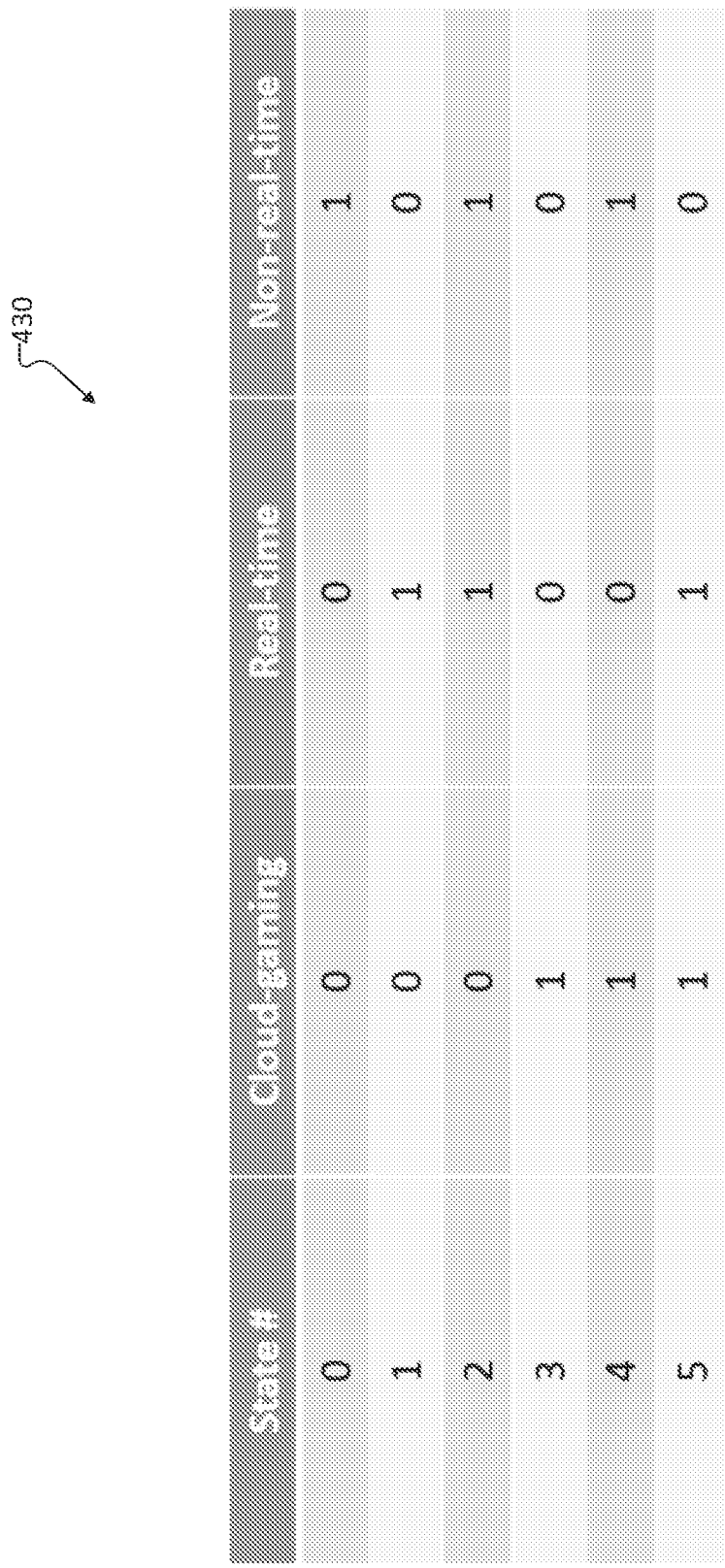

In other embodiments, the post processor 430 can be configured to use a state machine behavior model. FIG. 16 illustrates an example of the post processor 430 implemented using a state machine behavior model according to embodiments of the present disclosure. In FIG. 16, each state represents a service type or a combination of mixed service types. Therefore, the number of states is related to the number of defined service types. To move between the states, specific conditions have to be satisfied. One approach is to design the condition to move from a higher latency requirement service to a lower latency requirement service to be harder, which requires the higher detection frequency of lower demanding services, compared to the opposite case (transitioning from lower to higher demanding service). For example, if a communication session has to move from the cloud gaming state to the real-time state, then x recent predictions (x is empirically determined and ranging somewhere between n/2 and n) in the buffer slots can be required to be cloud gaming. On the other hand, to move from real-time to cloud gaming, it should take less than x to transition the state.

Output Stabilizer 440

The output stabilizer 440 operates to receive the output from the post processor 430, detect for presence of fluctuations in the output, and minimize the negative impact of any fluctuations. If the output stabilizer 440 detects any fluctuations in the output stream, the output stabilizer 440 can output the safer or stricter option between the service categories.

Figure 17:
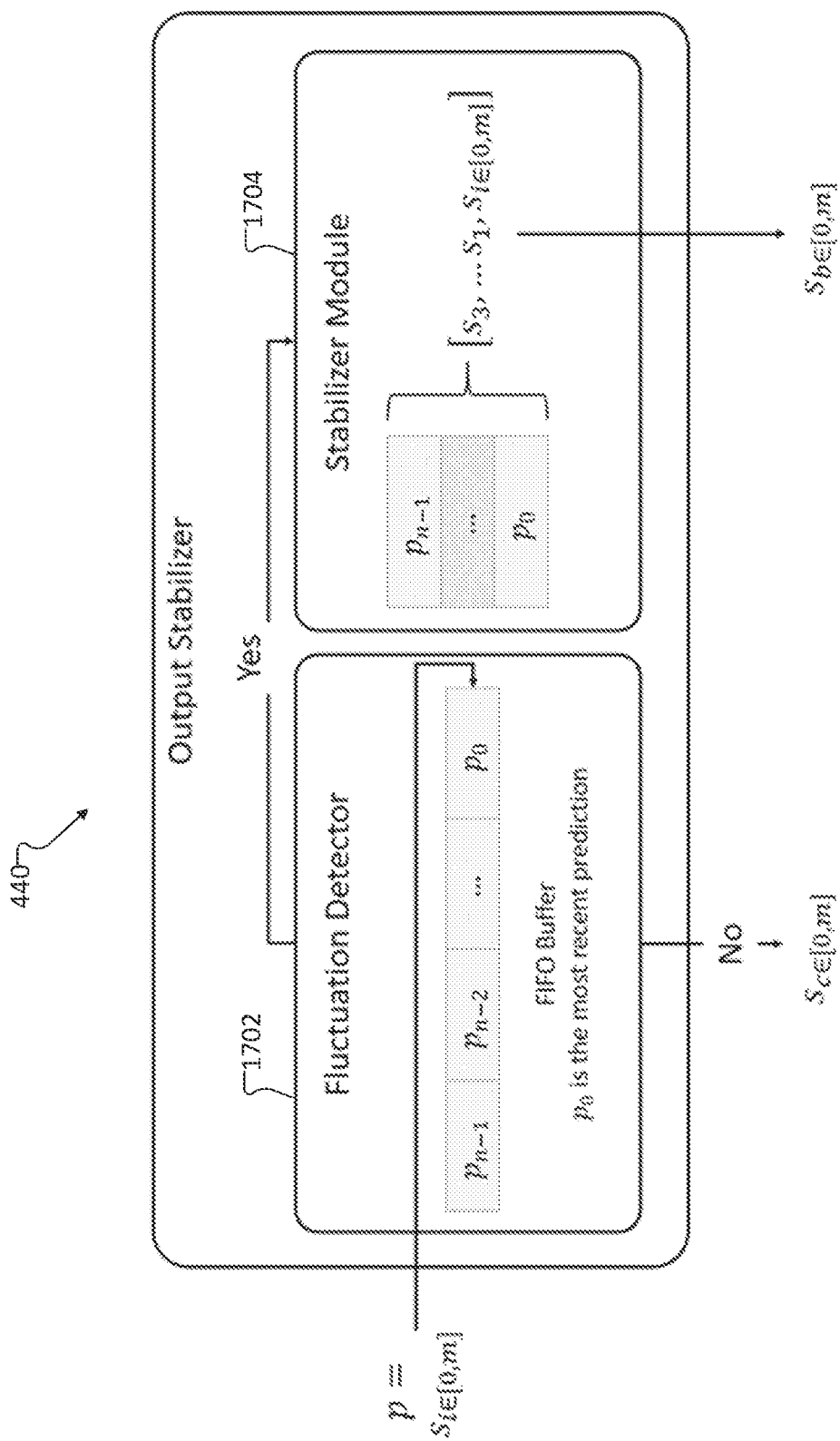
FIG. 17 illustrates an example architecture of an output stabilizer according to embodiments of the present disclosure.

FIG. 17 illustrates an example architecture of the output stabilizer 440 according to embodiments of the present disclosure. As shown in FIG. 17, the output stabilizer 440 includes a fluctuation detector 1702 and a stabilizer module 1704.

The fluctuation detector 1702 determines whether or not there is output fluctuation. The fluctuation detector 1702 uses a FIFO buffer b that stores the output of the post processor 430. The fluctuation detector 1702 performs an $n^{th}$ discrete difference operation on the buffer diff(b)=$\bar{b}$. If the number of non-zero values in $\bar{b}$ is equal to or greater than a certain threshold M (which can be empirically determined), then there is a fluctuation issue. In that case, the buffer b is passed into the stabilizer module 1704. At this point, the services presented in the buffer b can be extracted from the buffer b. The stabilizer module 1704 then examines the buffer and selects the highest latency requirement service $S_b$ among the fluctuating services to be returned. Otherwise, if there is no fluctuation, then the output stabilizer 440 returns the most common prediction $s_c$ from the post processor 430. As shown in FIG. 4, the output from the output stabilizer 440 is the prediction 450 (identified as $p=s_{i\in[0,m]}$), which is the final decision of the network service detector 302.

In another embodiment for fluctuation detection, a queue is used to store the post processing output with a queue length of Q. Fast Fourier Transformation is applied to the Q length of post processing output. If the high frequency component is higher than a threshold, then a fluctuation is detected.

Figure 18:
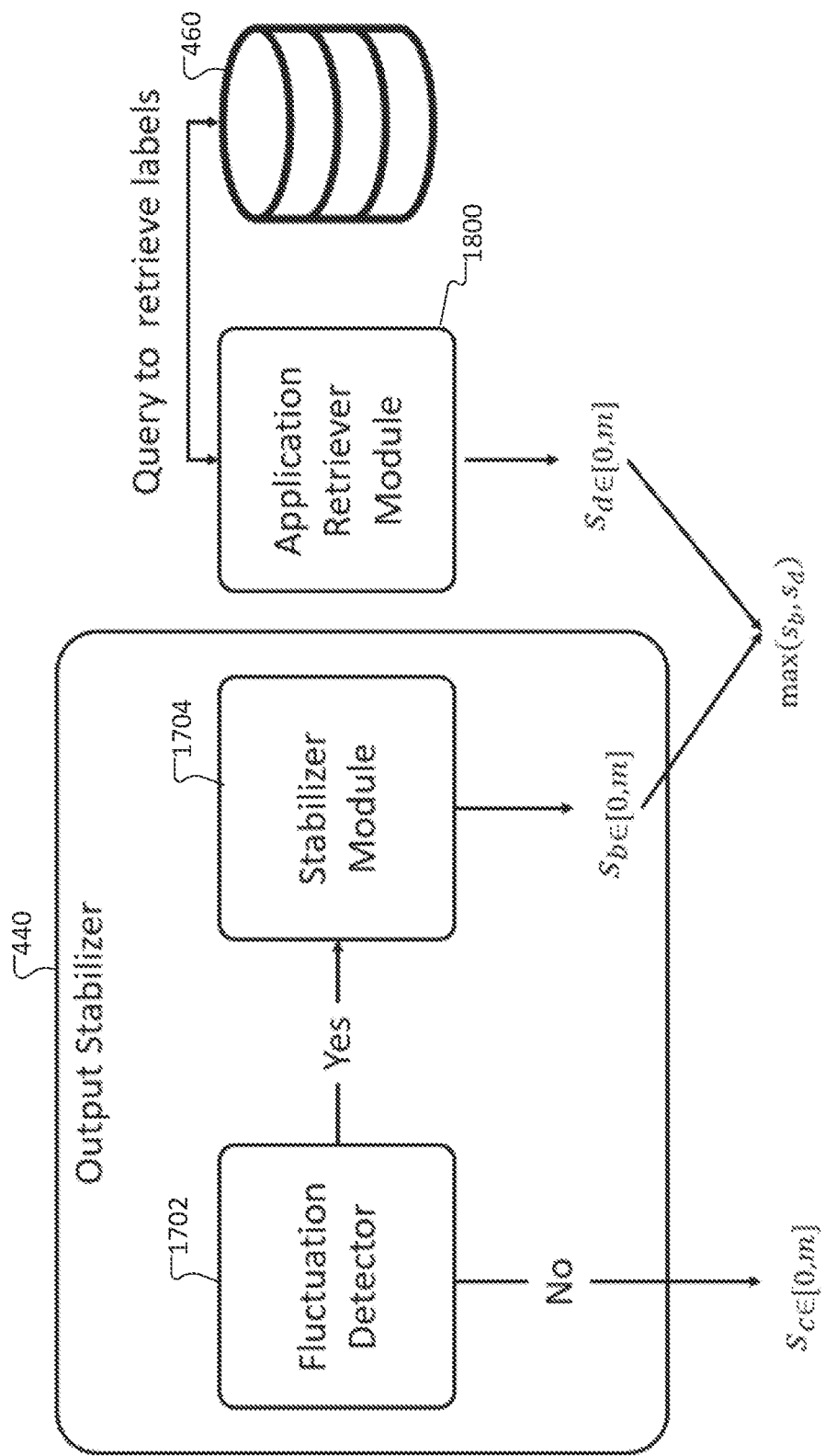
FIG. 18 illustrates additional details of the output stabilizer and a database according to embodiments of the present disclosure.

FIG. 18 illustrates additional details of the output stabilizer 440 and the database 460 according to embodiments of the present disclosure. As shown in FIG. 18, the database 460 (which can be local or remote) stores the network application information and labels with the services types to make a joint decision with the output stabilizer 440 in cases where fluctuation is detected. In some embodiments, a list of main applications executing on the device are retrieved by an application retriever 1800 and compared with the labeled apps in the database 460. The application retriever 1800 produces a prediction $S_d$. Then the final decision in the case of fluctuation will be the maximum in term of latency requirement between $S_b$ and $S_d$.

Standardizing the Output of the Network Service Detector 302

Figure 19:
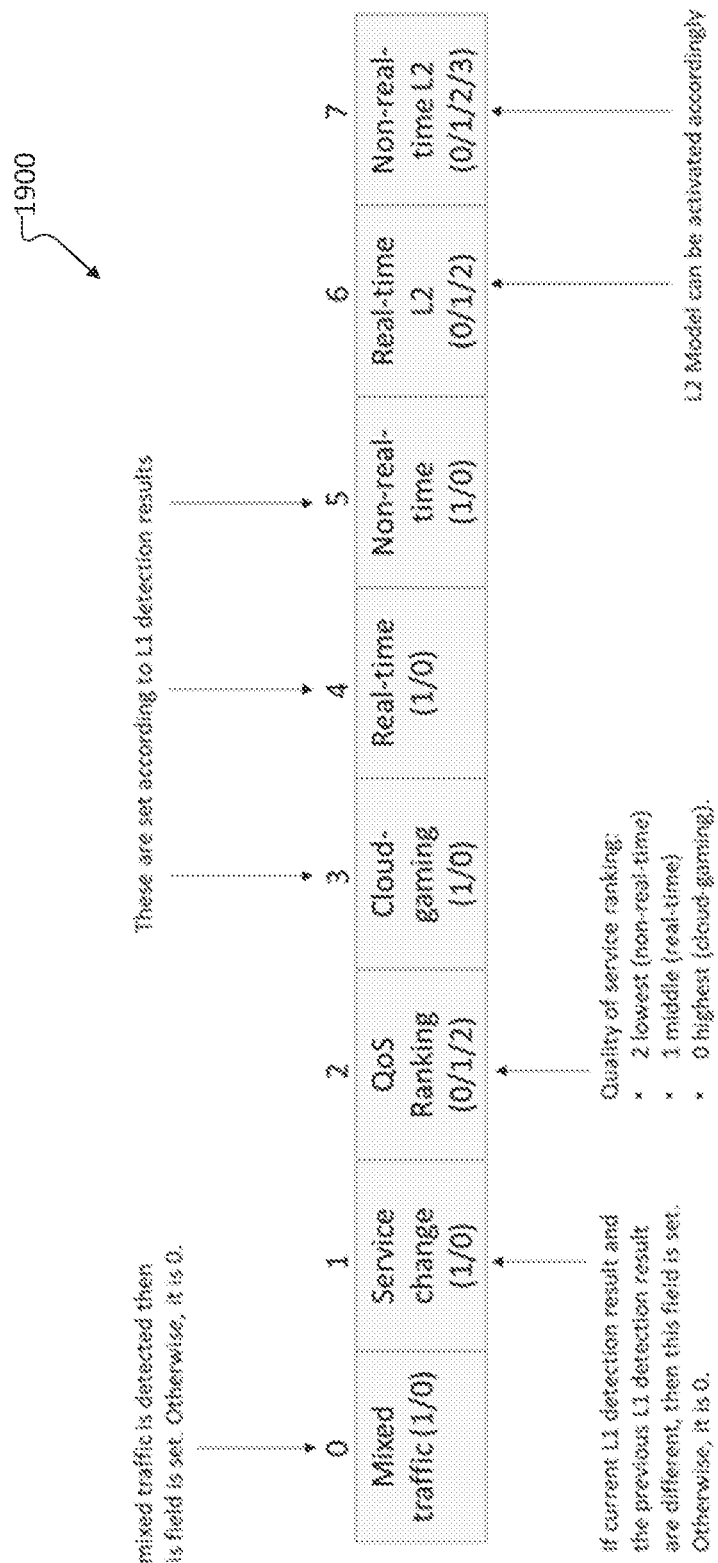
FIG. 19 illustrates an example of a standardized form of an output of the network service detector according to embodiments of the present disclosure.

In order to facilitate the use of the network service detector 302 across different applications, it can be advantageous to standardize the output of the network service detector 302. FIG. 19 illustrates an example of a standardized form of an output 1900 of the network service detector 302 according to embodiments of the present disclosure. As shown in FIG. 19, the standardized output 1900 has multiple fields that provide different information. Each field can be set according to the results of the network service detector 302. In the example shown in FIG. 19, the output 1900 is from a network service detector 302 that includes two layers L1 and L2, which can represent the coarse grain classifier 602 and the fine grain classifiers 604.

Figure 20:
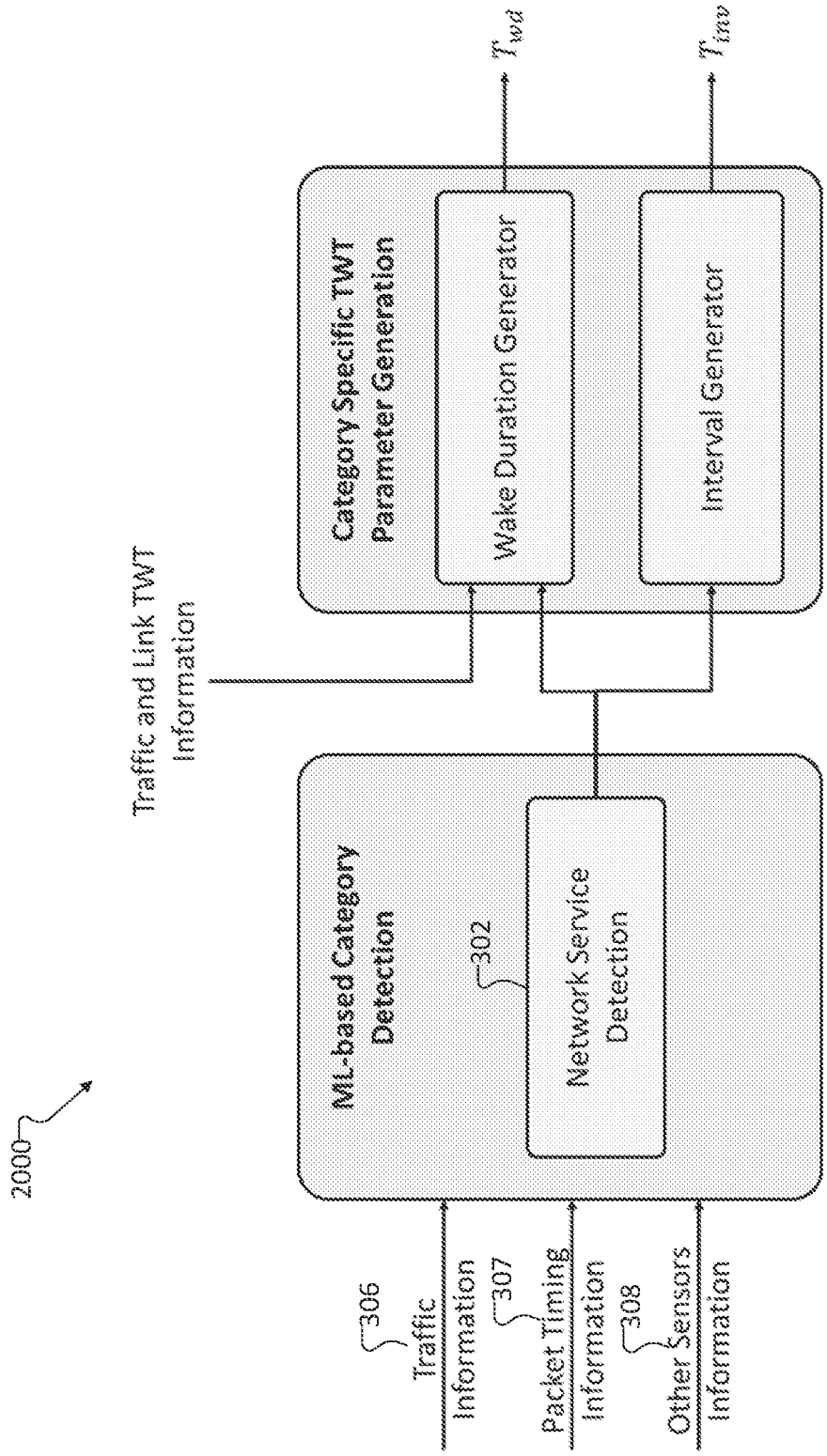
FIGS. 20 and 21 illustrate examples of applications that can use the network service detector according to embodiments of the present disclosure.
Figure 21:
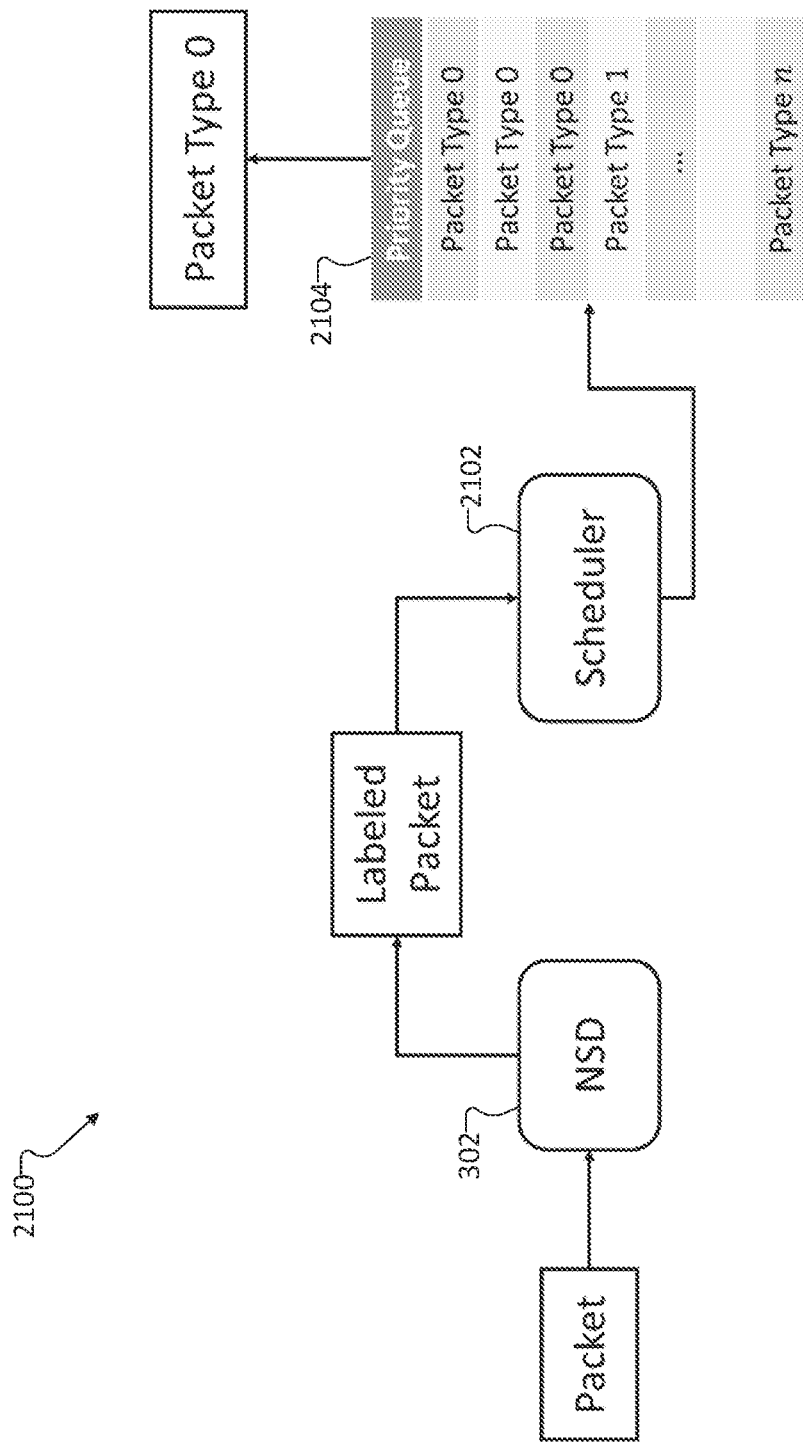

FIGS. 20 and 21 illustrate examples of applications that can use the network service detector 302 according to embodiments of the present disclosure. As shown in FIG. 20, an IEEE 802.11ax Target Wake Time (TWT) system 2000 can configure a TWT wake interval and a TWT wake duration based on the service that is detected by the network service detector 302. The TWT hyper-parameters can be intelligently configured with the help of the network service detector 302, thus enabling joint reduction of device power consumption and wireless medium congestion.

The system 2000 can detect the latency requirement and adaptively configure the target wake interval $T_{inv}$ and targe wake duration $T_{wd}$. To achieve this, applications that have similar latency requirement and data characteristics are grouped together to form a service type (such as video call, audio call, streaming, etc.). Then the network service detector 302 is utilized to detect the service type in real time using a set of selected features. Each service type has a corresponding predefined latency requirement, and $T_{inv}$ and $T_{wd}$ are configured according to the corresponding service latency requirement.

As shown in FIG. 21, a dynamic packet scheduling system 2100 uses a network service type detected by the network service detector 302. The packet scheduling system 2100 uses the network service detector 302 to provide essential information to optimize a packet scheduler 2102. The packet scheduler 2102 is the traffic control module that regulates how much data is allowed for an application. Specifically, when a service type is detected, a set of scheduling parameters can be configured to the transceiver accordingly. The scheduler parameter sets could also be decided based on subsequent finer network service detection layers.

By identifying the type of services present in the traffic using the network service detector 302, the packet scheduling system 2100 is able to configure the packet scheduler 2102 to prioritize the transmission of packets belonging to the service that has higher latency requirement. Specifically, after detecting the network service types in the traffic, the packets are labeled with certain weight/priority based on the latency requirement. Then the packets are added into a priority queue 2104 and later dispensed base on their priority. This dynamic packet scheduling utilizing the network service detector 302 effectively turns the packet scheduler 2102 into a priority scheduler which can improve the quality of service.

Closed-Loop Quality of Service (QoS)/Quality of Experience (QoE)

In some embodiments, results from the network service detector 302 can be used for measuring the QoE for users. Different network service types may have different requirements on QoS. For example, video calls can have tight requirements on network throughput, while mobile gaming can have tight requirements on network delay. Without knowing the traffic service type, it is difficult to measure how good the QoE is based on the network condition. However, once a network service type is detected using the network service detector 302, a corresponding QoE measurement metric can be calculated to measure how good the current user QoE is.

In one example of this embodiment, once a video call is detected, the equation and method from the International Telecommunication Union (ITU) G1070 standard can be used to calculate the user QoE. Once an audio call is detected, the E-model equations can be used to calculate the user QoE. Under these conditions, even though the same network conditions are provided, the user QoE could be different. With the help of the network service detector 302, it is possible to provide a more accurate estimation of network quality to the user.

Abnormality Detection

This use-case involves TWT functionality, such as shown in FIG. 20. When TWT is negotiated, the TWT itself typically introduces additional latency to the current network service. There can be three reasons which may lead to a QoS issue after enabling TWT.

First, for some AP or STA, the TWT function may not work properly. Those problems can be caused by firmware or hardware problems within the AP or STA. Thus, it is important to detect any abnormal AP and STA which has malfunctioned TWT, and then the TWT functions need to be disabled for those AP or STA.

Second, for some specific network service (such as mobile gaming, etc.), if a bad network condition is discovered, then it may lead to a QoS issue when TWT is enabled. Thus, the network service detector 302 can be used to detect those network services and the corresponding bad network condition, and then the TWT function can be disabled.

Third, for some specific network service (such as mobile gaming, etc.), there can sometimes be problems with its network server. The bad server can cause delay and large latency in transceiving packets, and the TWT function also needs to be turned off to avoid adding any extra latency to the communication chain. Thus, the network service detector 302 can be used to detect the specific network service and whether the server of this network service is having any problems. If the network service's server is detected to behave abnormally, the TWT function can be turned off.

Although FIGS. 3 through 21 illustrate an example of a system architecture 300 for detecting network services based on network traffic using machine learning and related details, various changes may be made to FIGS. 3 through 21. For example, various components in FIGS. 3 through 21 could be combined, further subdivided, or omitted and additional components could be added according to particular needs. In addition, various operations in FIGS. 3 through 21 could overlap, occur in parallel, occur in a different order, or occur any number of times.

Figure 22:
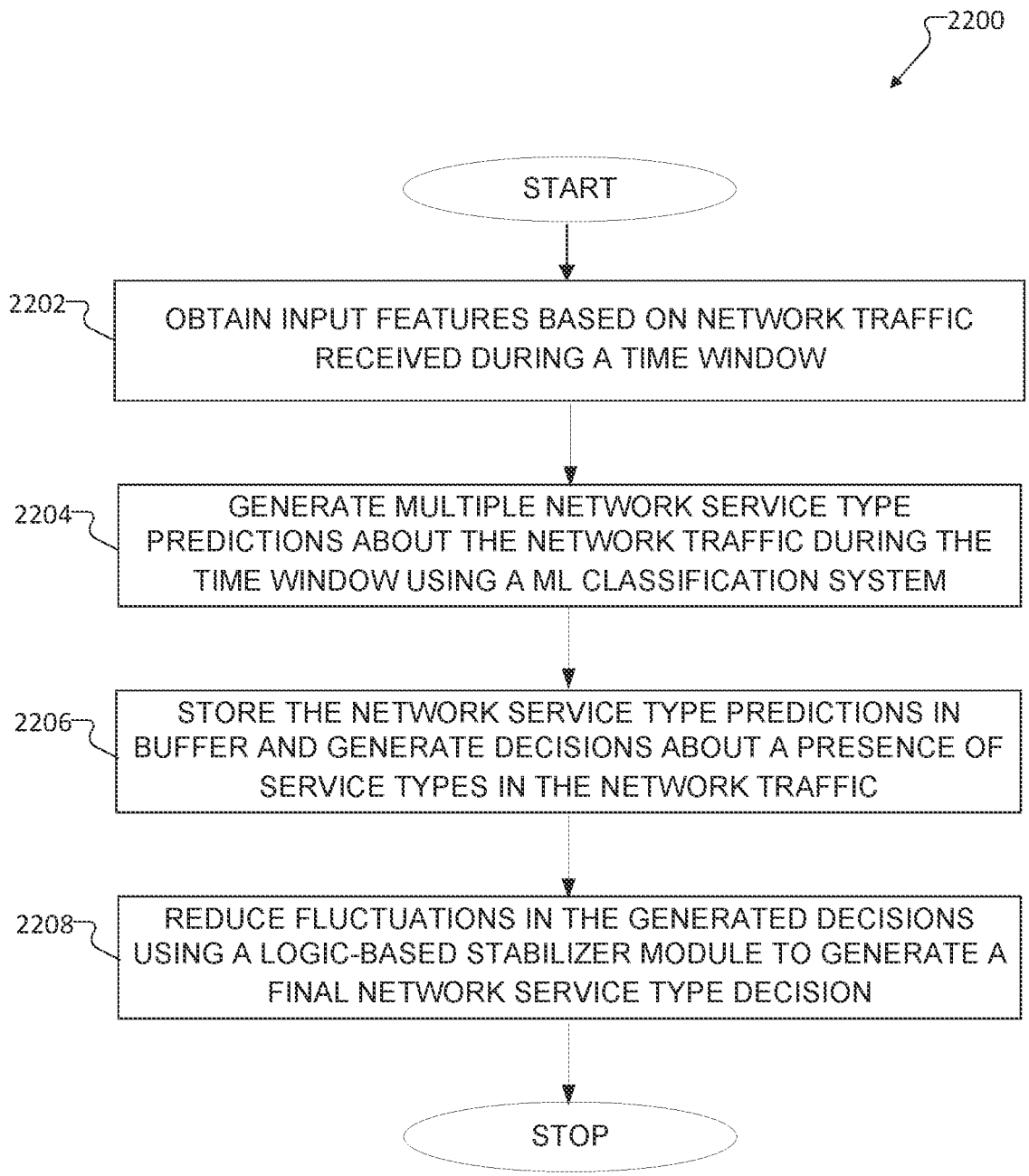
FIG. 22 illustrates a flow chart of a method for detecting network services based on network traffic using machine learning according to embodiments of the present disclosure.

FIG. 22 illustrates a flow chart of a method 2200 for detecting network services based on network traffic using machine learning according to embodiments of the present disclosure, as may be performed by one or more components of the system architecture 300 (e.g., the network service detector 302). The embodiment of the method 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions.

As illustrated in FIG. 22, the method 2200 begins at step 2202. At step 2202, input features are obtained based on network traffic received during a time window. This could include, for example, the input processor 410 obtaining or generating network traffic features 415 based on network traffic received during a time window. These features 415 can be obtained or generated based on the traffic information 306, the packet timing information 307, and the sensor information 308.

At step 2204, multiple network service type predictions about the network traffic during the time window are generated using a ML classification system operating on the input features. This could include, for example, the service detector module 420 using the network traffic features 415 to generate multiple network service type predictions p about the network traffic during the time window.

At step 2206, the multiple network service type predictions are stored in different time steps in a FIFO buffer, and decisions about a presence of each of multiple service types in the network traffic are generated using a voting algorithm. This could include, for example, the post processor 430 storing the multiple network service type predictions in different time steps in the buffer 1200 and generating decisions about a presence of each of multiple service types in the network traffic using one of the voting schemes shown in FIGS. 13 through 16.

At step 2208, fluctuations are reduced in the generated decisions using a logic-based stabilizer module to generate a final network service type decision. This could include, for example, the output stabilizer 440 reducing fluctuations in the generated decisions using the stabilizer module 1704 to generate a final network service type prediction 450.

Although FIG. 22 illustrates one example of a method 2200 for detecting network services based on network traffic using machine learning, various changes may be made to FIG. 22. For example, while shown as a series of steps, various steps in FIG. 22 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
obtaining input features based on network traffic received during a time window;
generating multiple network service type predictions about the network traffic during the time window using a machine learning (ML) classification system operating on the input features;
storing the multiple network service type predictions in different time steps in a first-in first-out (FIFO) buffer and generating decisions about a presence of each of multiple service types in the network traffic using a voting algorithm; and
reducing fluctuations in the generated decisions using a logic-based stabilizer module to generate a final network service type decision,
wherein the ML classification system comprises a coarse grain ML classifier that classifies the network service type predictions into categories and one or more fine grain ML classifiers that operate on categorized results from the coarse grain ML classifier to classify the network service type predictions into sub-categories.

2. The method of claim 1, wherein at least one of the coarse grain ML classifier or the one or more fine grain ML classifiers comprises at least one multi-label ML classifier.

3. The method of claim 2, wherein each of the at least one multi-label ML classifier comprises (i) a single multi-output multi-label ML classifier or (ii) multiple single-output binary classifiers, the multiple single-output binary classifiers comprising at least one of: a recurrent neural network (RNN), a convolutional neural network (CNN), a random forest, a gradient boosted decision tree, or a support vector machine (SVM).

4. The method of claim 1, wherein the voting algorithm comprises a majority voting algorithm, a weighted voting algorithm, a bias voting algorithm, or a state-machine-based algorithm.

5. The method of claim 1, wherein the logic-based stabilizer module comprises:
a fluctuation detection module configured to detect the fluctuations in the generated decisions; and
a stabilization algorithm configured to reduce the detected fluctuations.

6. The method of claim 1, wherein the obtained input features comprise at least one of:
uplink maximum inter-arrival time,
upline average inter-arrival time,
uplink and downlink packet counts,
uplink and downlink minimum packet size,
uplink and downlink maximum packet size,
uplink and downlink average packet size,
uplink and downlink User Datagram Protocol (UDP) packet counts,
uplink and downlink Transmission Control Protocol (TCP) packet counts,
a list of currently running applications on a user equipment (UE),
a user touch screen interaction,
a usage status of one or more peripherals, and
Bluetooth connection information.

7. The method of claim 1, wherein the final network service type decision comprises at least one of: an audio call service, a video call service, a gaming service, a streaming service, a web browsing service, or a file transferring service.

8. A device comprising:
a transceiver configured to receive network traffic during a time window; and
a processor operably connected to the transceiver, the processor configured to:
obtain input features based on the network traffic;
generate multiple network service type predictions about the network traffic during the time window using a machine learning (ML) classification system operating on the input features;
store the multiple network service type predictions in different time steps in a first-in first-out (FIFO) buffer and generate decisions about a presence of each of multiple service types in the network traffic using a voting algorithm; and
reduce fluctuations in the generated decisions using a logic-based stabilizer module to generate a final network service type decision,
wherein the ML classification system comprises a coarse grain ML classifier that classifies the network service type predictions into categories and one or more fine grain ML classifiers that operate on categorized results from the coarse grain ML classifier to classify the network service type predictions into sub-categories.

9. The device of claim 8, wherein at least one of the coarse grain ML classifier or the one or more fine grain ML classifiers comprises at least one multi-label ML classifier.

10. The device of claim 9, wherein each of the at least one multi-label ML classifier comprises (i) a single multi-output multi-label ML classifier or (ii) multiple single-output binary classifiers, the multiple single-output binary classifiers comprising at least one of: a recurrent neural network (RNN), a convolutional neural network (CNN), a random forest, a gradient boosted decision tree, or a support vector machine (SVM).

11. The device of claim 8, wherein the voting algorithm comprises a majority voting algorithm, a weighted voting algorithm, a bias voting algorithm, or a state-machine-based algorithm.

12. The device of claim 8, wherein the logic-based stabilizer module comprises:
a fluctuation detection module configured to detect the fluctuations in the generated decisions; and
a stabilization algorithm configured to reduce the detected fluctuations.

13. The device of claim 8, wherein the obtained input features comprise at least one of:
uplink maximum inter-arrival time,
upline average inter-arrival time,
uplink and downlink packet counts,
uplink and downlink minimum packet size,
uplink and downlink maximum packet size,
uplink and downlink average packet size,
uplink and downlink User Datagram Protocol (UDP) packet counts,
uplink and downlink Transmission Control Protocol (TCP) packet counts,
a list of currently running applications on a user equipment (UE),
a user touch screen interaction,
a usage status of one or more peripherals, and
Bluetooth connection information.

14. The device of claim 8, wherein the final network service type decision comprises at least one of: an audio call service, a video call service, a gaming service, a streaming service, a web browsing service, or a file transferring service.

15. A non-transitory computer readable medium comprising program code that, when executed by a processor of a device, causes the device to:
obtain input features based on network traffic received during a time window;
generate multiple network service type predictions about the network traffic during the time window using a machine learning (ML) classification system operating on the input features;
store the multiple network service type predictions in different time steps in a first-in first-out (FIFO) buffer and generate decisions about a presence of each of multiple service types in the network traffic using a voting algorithm; and
reduce fluctuations in the generated decisions using a logic-based stabilizer module to generate a final network service type decision,
wherein the ML classification system comprises a coarse grain ML classifier that classifies the network service type predictions into categories and one or more fine grain ML classifiers that operate on categorized results from the coarse grain ML classifier to classify the network service type predictions into sub-categories.

16. The non-transitory computer readable medium of claim 15, wherein at least one of the coarse grain ML classifier or the one or more fine grain ML classifiers comprises at least one multi-label ML classifier.

17. The non-transitory computer readable medium of claim 16, wherein each of the at least one multi-label ML classifier comprises (i) a single multi-output multi-label ML classifier or (ii) multiple single-output binary classifiers, the multiple single-output binary classifiers comprising at least one of: a recurrent neural network (RNN), a convolutional neural network (CNN), a random forest, a gradient boosted decision tree, or a support vector machine (SVM).

18. The non-transitory computer readable medium of claim 15, wherein the voting algorithm comprises a majority voting algorithm, a weighted voting algorithm, a bias voting algorithm, or a state-machine-based algorithm.

19. The non-transitory computer readable medium of claim 15, wherein the logic-based stabilizer module comprises:
- a fluctuation detection module configured to detect the fluctuations in the generated decisions; and
- a stabilization algorithm configured to reduce the detected fluctuations.

20. The non-transitory computer readable medium of claim 15, wherein the final network service type decision comprises at least one of: an audio call service, a video call service, a gaming service, a streaming service, a web browsing service, or a file transferring service.

* * * * *